United States Patent
Cichanowicz

(10) Patent No.: US 7,198,769 B2
(45) Date of Patent: *Apr. 3, 2007

(54) MULTI-STAGE PROCESS FOR SCR OF NOX

(76) Inventor: J. Edward Cichanowicz, P.O. Box 905, Saratoga, CA (US) 95071

( * ) Notice: Subject to any disclaimer, the term of this patent is extended or adjusted under 35 U.S.C. 154(b) by 143 days.

This patent is subject to a terminal disclaimer.

(21) Appl. No.: 10/725,057

(22) Filed: Dec. 2, 2003

(65) Prior Publication Data

US 2005/0118084 A1    Jun. 2, 2005

(51) Int. Cl.
*B01D 53/56* (2006.01)
(52) U.S. Cl. .................................. 423/239.1
(58) Field of Classification Search ........... 423/235, 423/239.1
See application file for complete search history.

(56) References Cited

U.S. PATENT DOCUMENTS

| | | | |
|---|---|---|---|
| 4,880,378 A | | 11/1989 | Hums |
| 4,889,698 A | * | 12/1989 | Moller et al. ............... 423/210 |
| 5,233,934 A | | 8/1993 | Krigmont et al. |
| 6,077,491 A | * | 6/2000 | Cooper et al. ............... 423/235 |
| 6,117,405 A | * | 9/2000 | Frey et al. .................. 423/235 |
| 6,136,283 A | * | 10/2000 | Stern ........................ 423/235 |
| 6,706,246 B2 | * | 3/2004 | Hopkins et al. ........... 423/239.1 |
| 6,743,404 B1 | * | 6/2004 | Schumacher et al. ..... 423/239.1 |

OTHER PUBLICATIONS

"*Ljungstrom air Preheater Fouling Due to SCR Amonia Slip*", by W. Counterman et al., presented to the 1999 EPRI Workshop on SCR, Orlando, FL, Mar. 1999.

"*Enhance Ammonia Distribution for Maximum SCR Performance*", by Ralf Sigling, Cindy Khalaf, Edward Healy, Institute of Clean Air Companies, Forum 2003, Nashville, TN, Oct. 14-15, 2003.

* cited by examiner

*Primary Examiner*—Edward M. Johnson
(74) *Attorney, Agent, or Firm*—Robert K. Carpenter

(57) ABSTRACT

A selective catalytic reduction apparatus has at least first and last catalyst layers in series for reducing nitrogen oxides in a flue gas, at least one interstage heat exchanger located after the first layer and before the last layer, that lowers flue gas temperature, and that acts as a mixing body to lower the standard deviation of the $NH_3/NO$ ratio entering catalyst layers after the first catalyst layer, thus providing better consumption of both ammonia and NOx in the reactor than would be achieved in the absence of the at least one interstage heat exchanger.

7 Claims, 13 Drawing Sheets

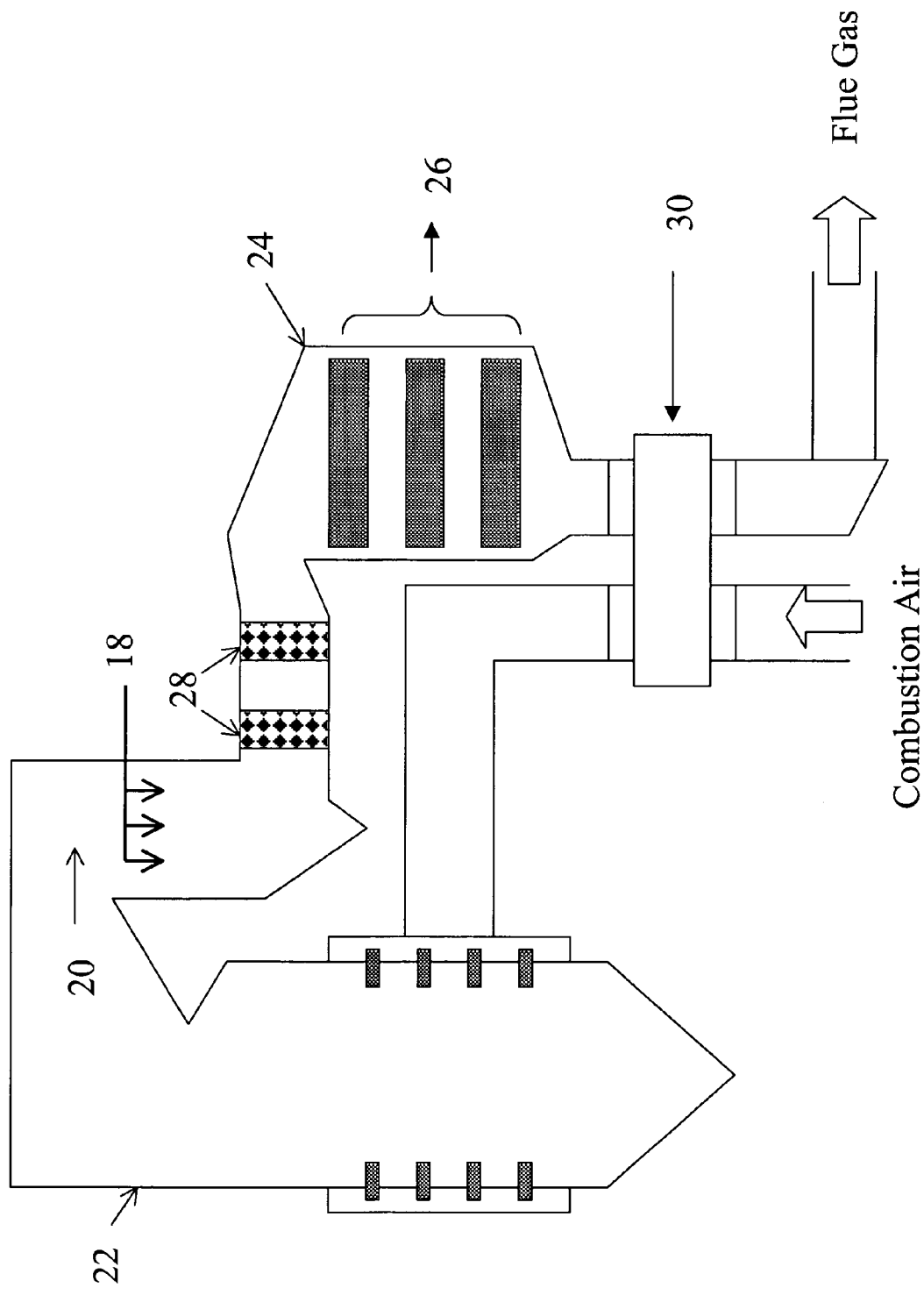
Figure 1: Conventional SCR Process Arrangement

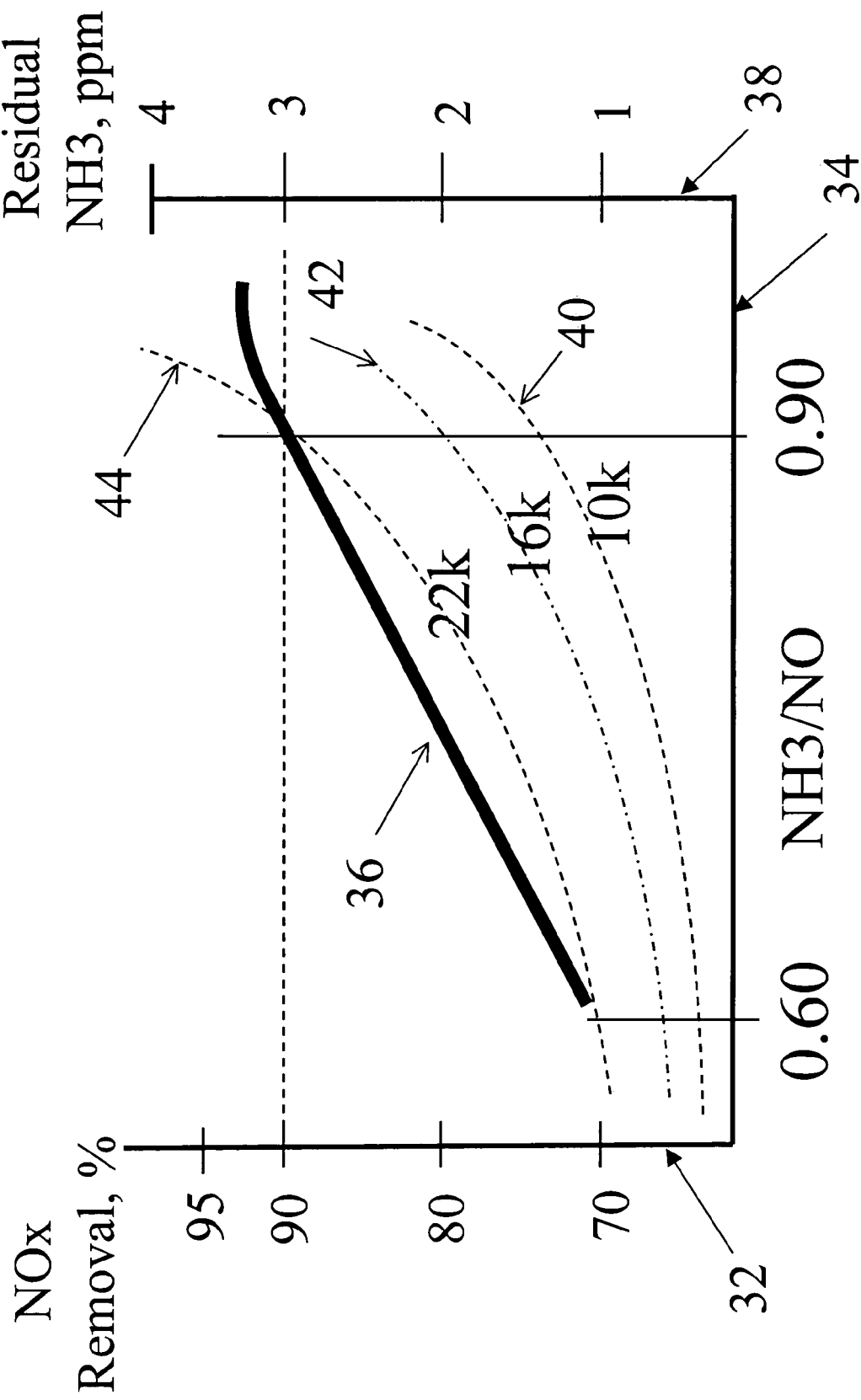
Figure 2: Typical SCR NOx Removal and Residual NH3

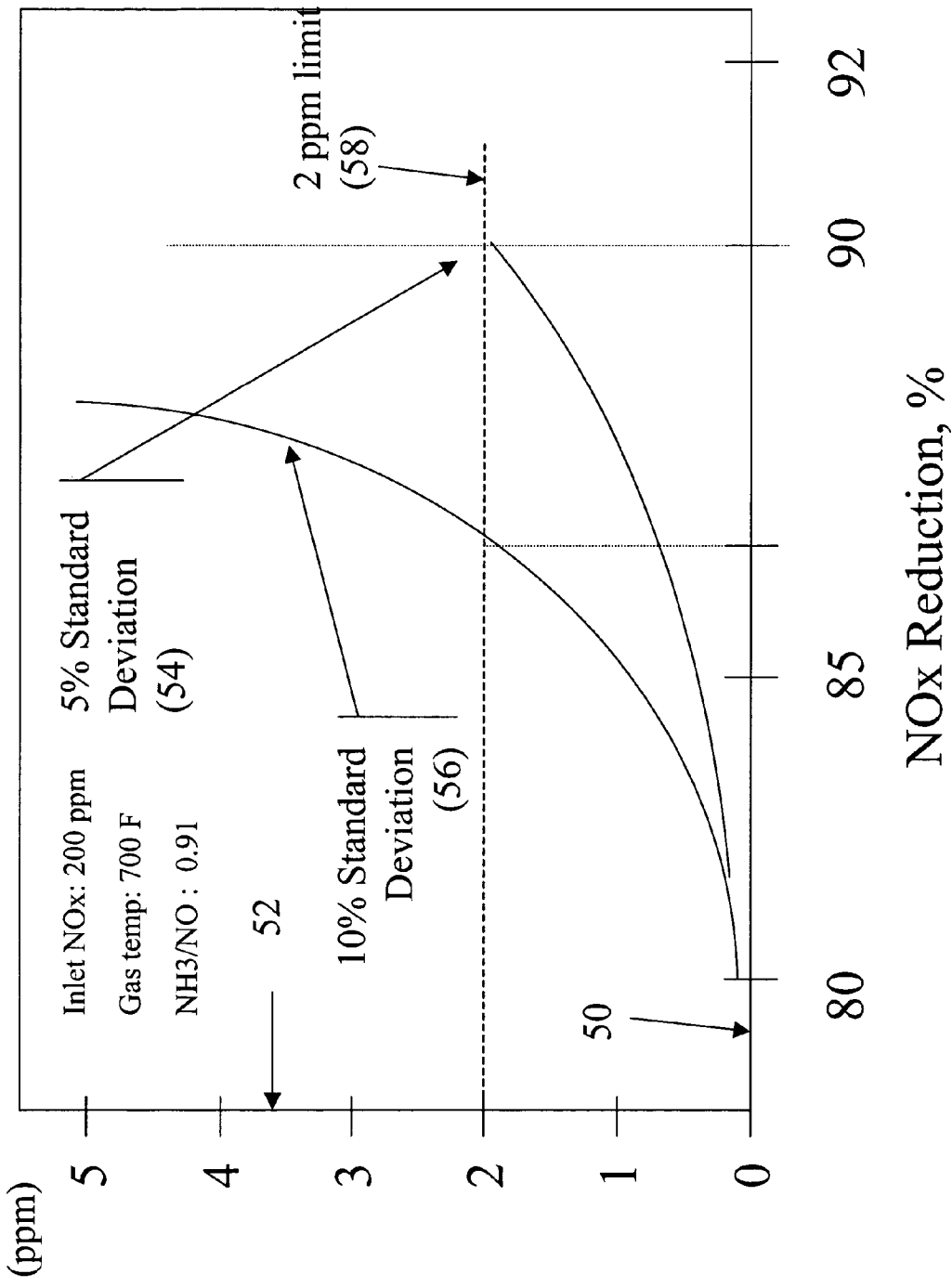

FIGURE 4: SCR PROCESS CONDITIONS ACROSS THE REACTOR AND EACH OF THREE CATALYST LAYERS

| | NOx Removal (%) | NOx (ppm) | NH3 (ppm) | Overall NH3/NO Ratio | NH3 Deviation (ppm) | NH3/NO Standard Deviation Entering Layer | SO3 Created by SCR (ppm) | ABS Onset Temp, F |
|---|---|---|---|---|---|---|---|---|
| Process Inlet | | 200 | 182 | 0.91 | 9 | 5% | 15 | 575 |
| Layer 1 | | | | | | | | |
| Across | 68% | 136 | 136 | | | | | |
| Exit | | 64 | 46 | 0.72 | 9 | 14% | 21 | 450 |
| Layer 2 | | | | | | | | |
| Across | 19% | 38 | 38 | | | | | |
| Exit | | 26 | 8 | 0.31 | 9 | 35% | 31 | 430 |
| Layer 3 | | | | | | | | |
| Across | 3% | 6 | 6 | | | | | |
| Exit | | 20 | 2 | 0.10 | 9 | 46% | 45 | 375 |

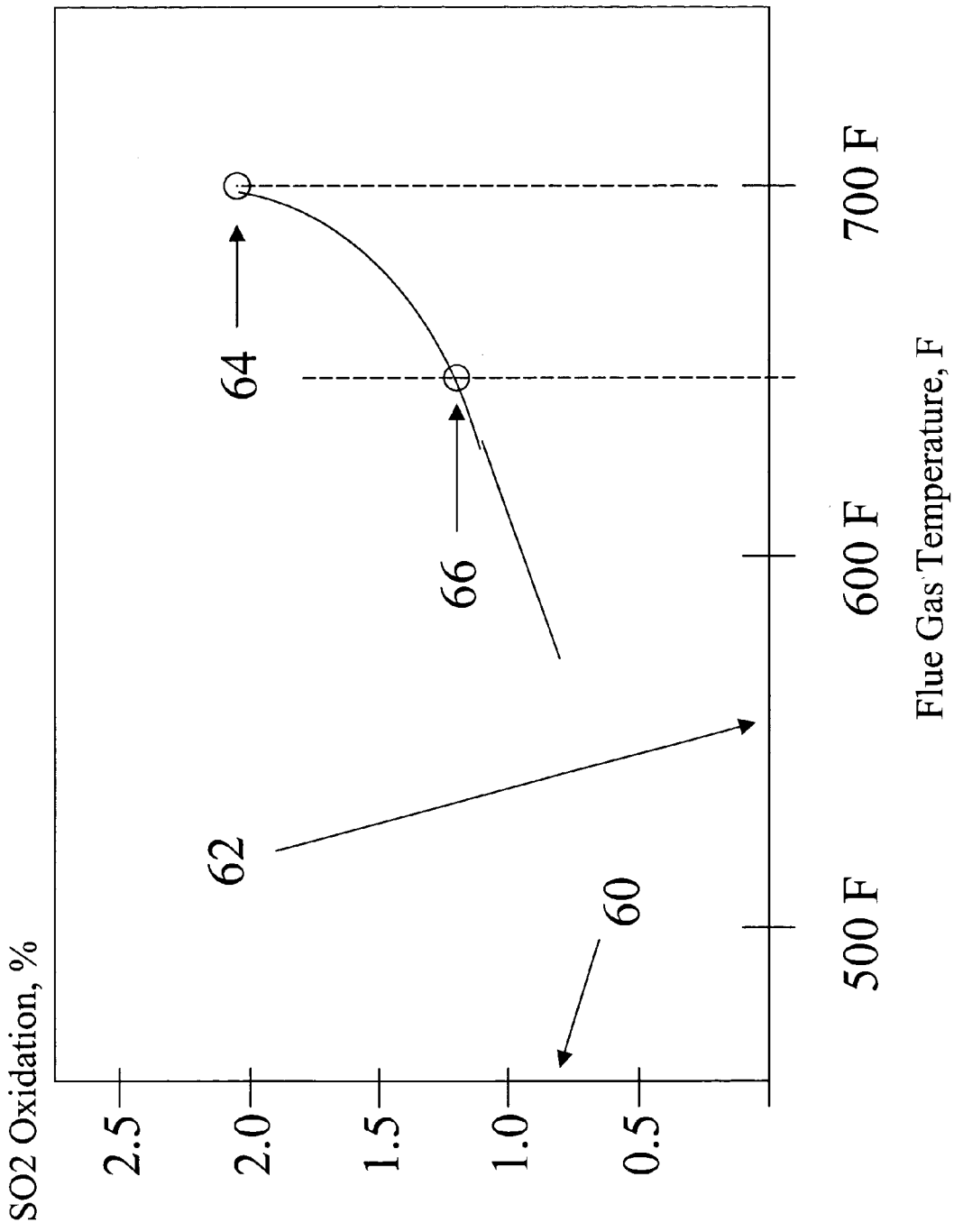
Figure 5: The Influence of Gas Temperature on SO2 Oxidation

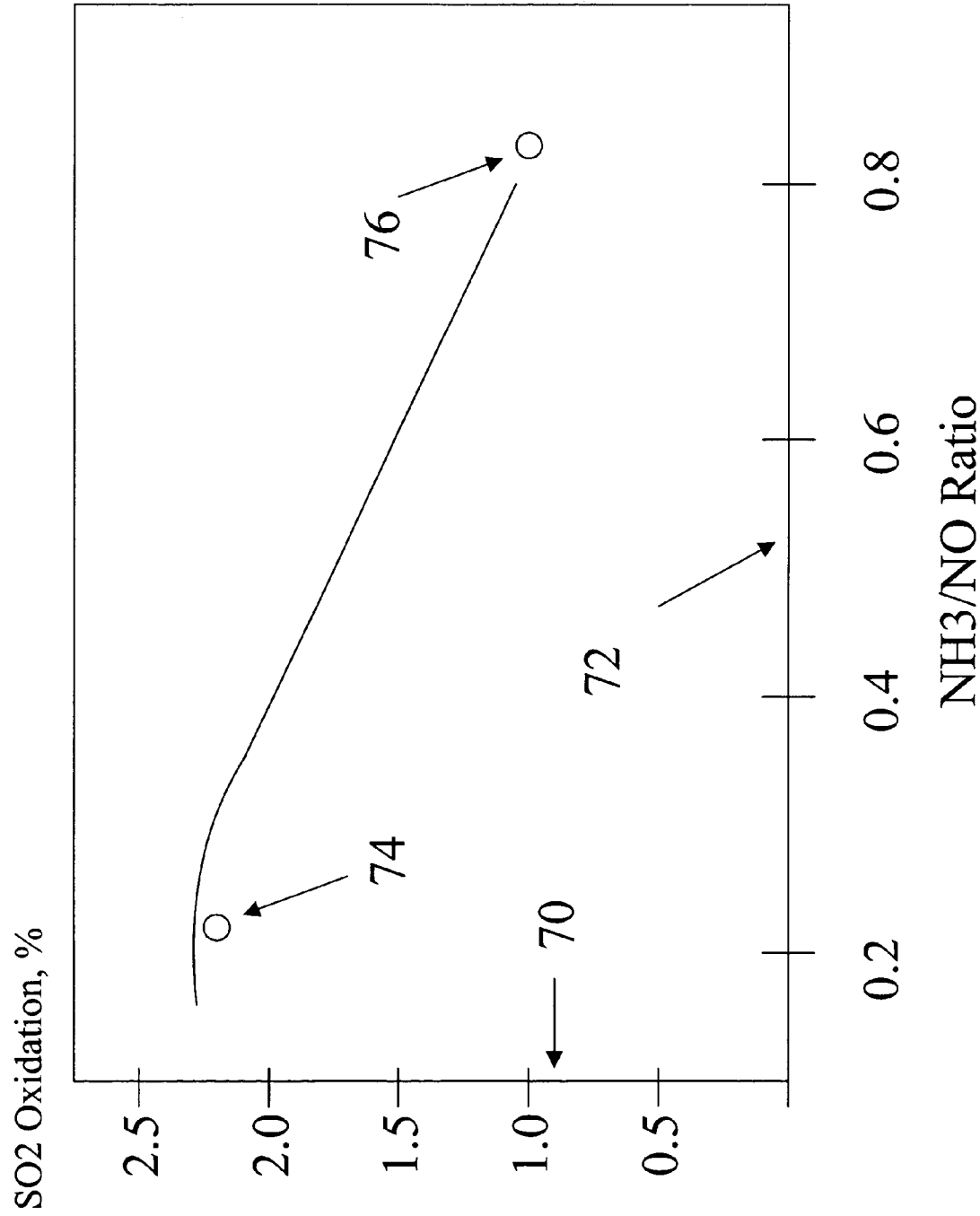
Figure 6: SO2 Oxidation As a Function of NH3/NO Ratio

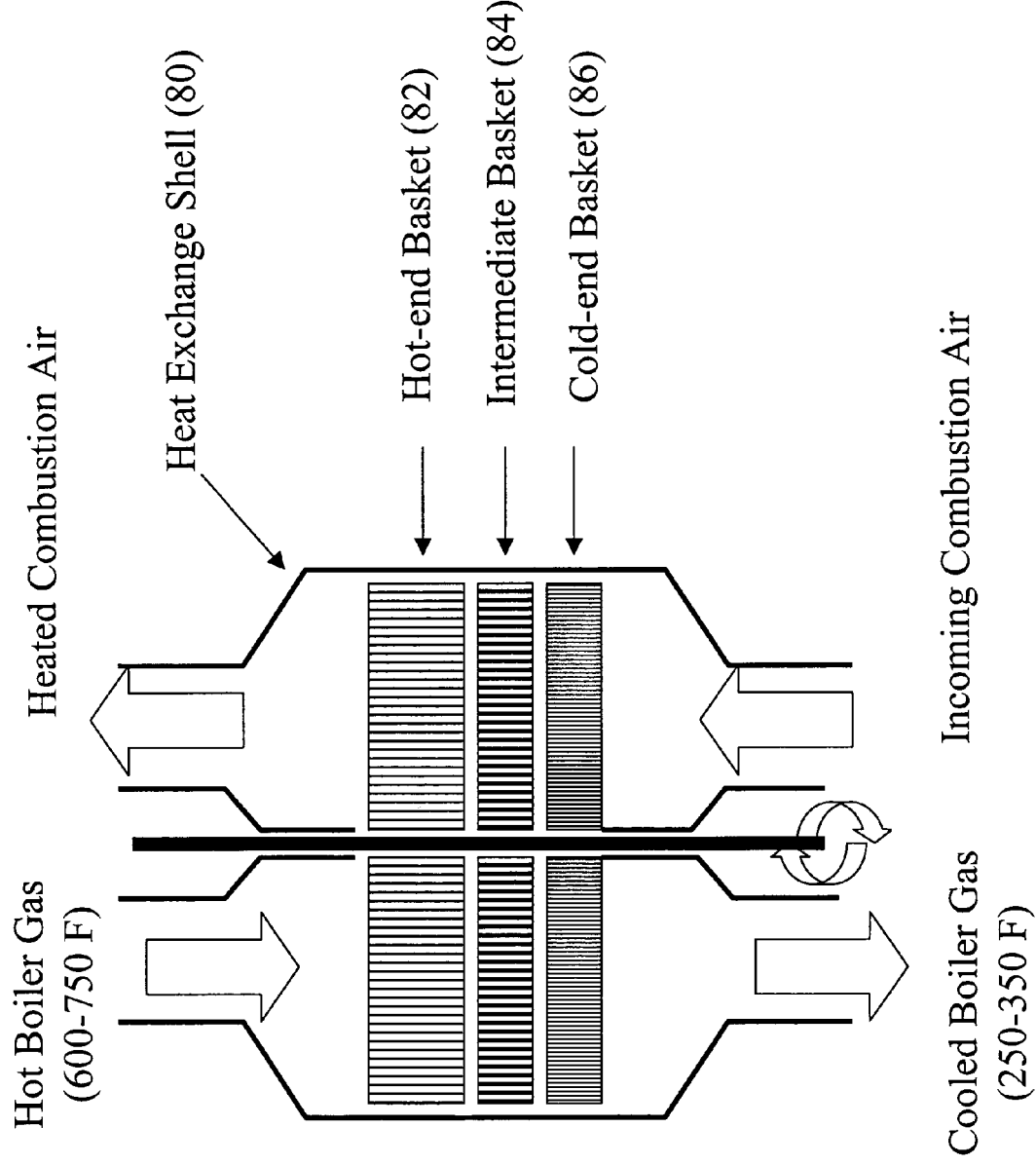
Figure 7: Conventional Ljungstrom-type Air Heater

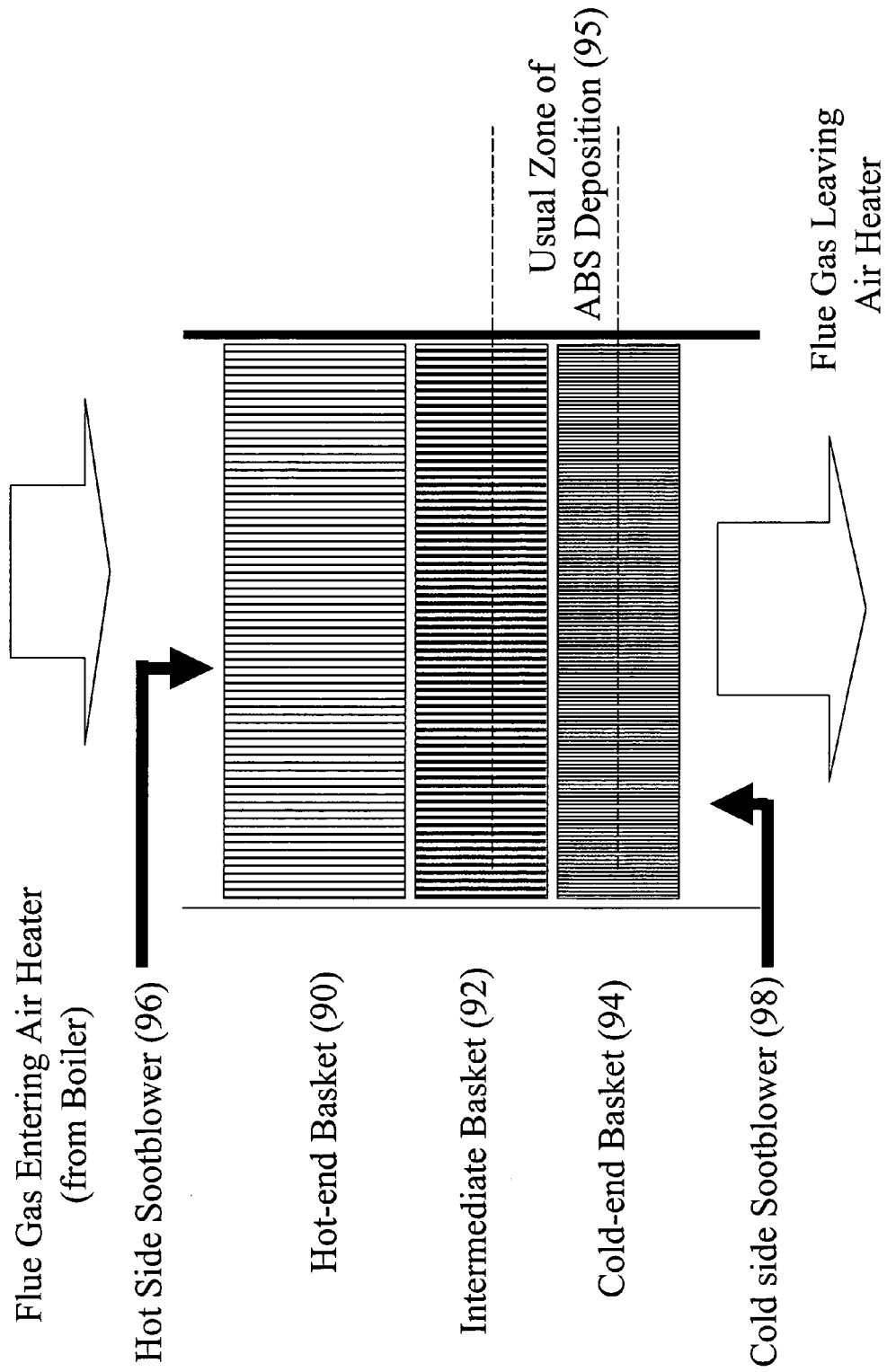
Figure 8: Detail of Heat Exchange Surfaces

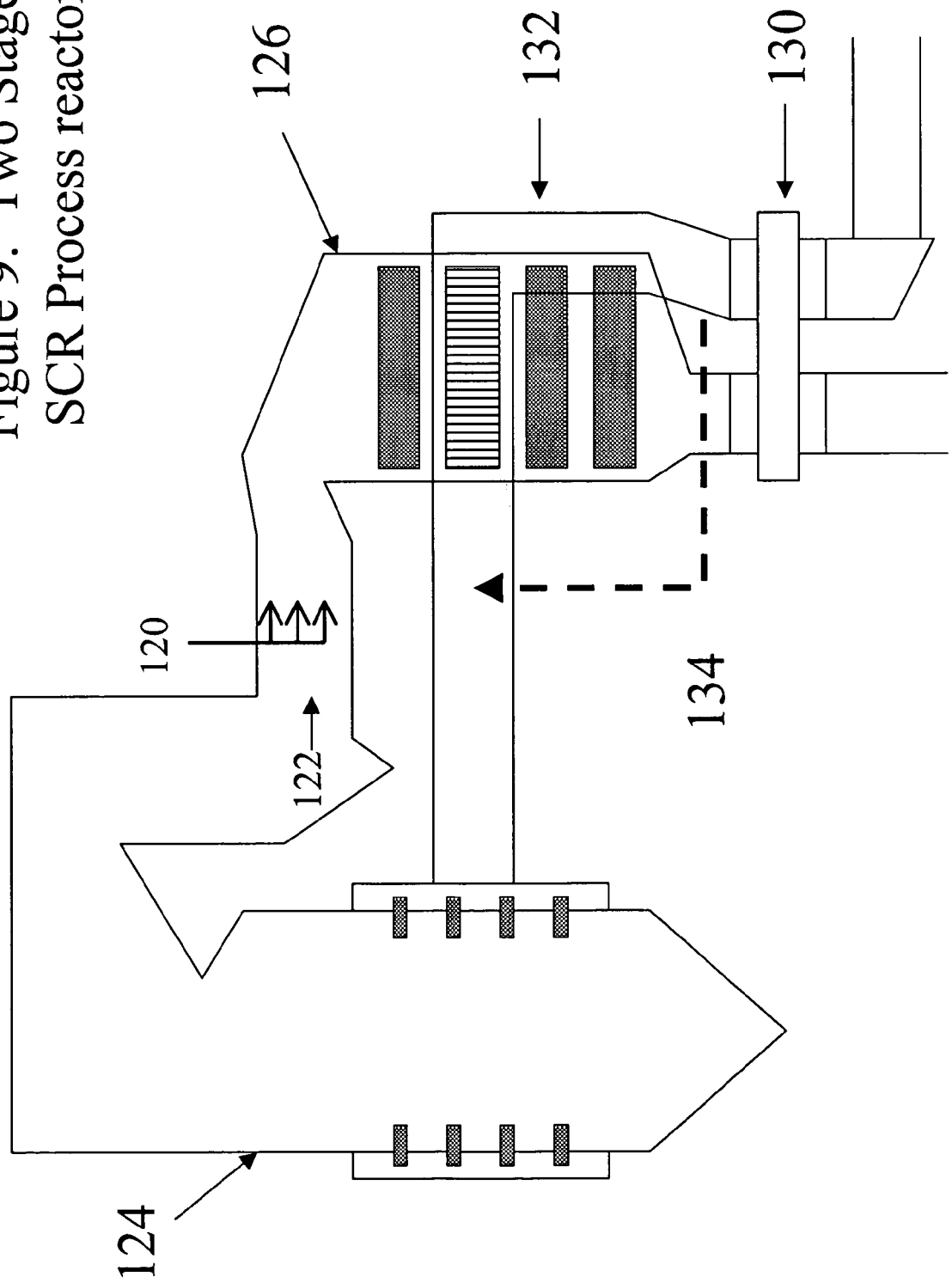
Figure 9: Two Stage SCR Process reactor

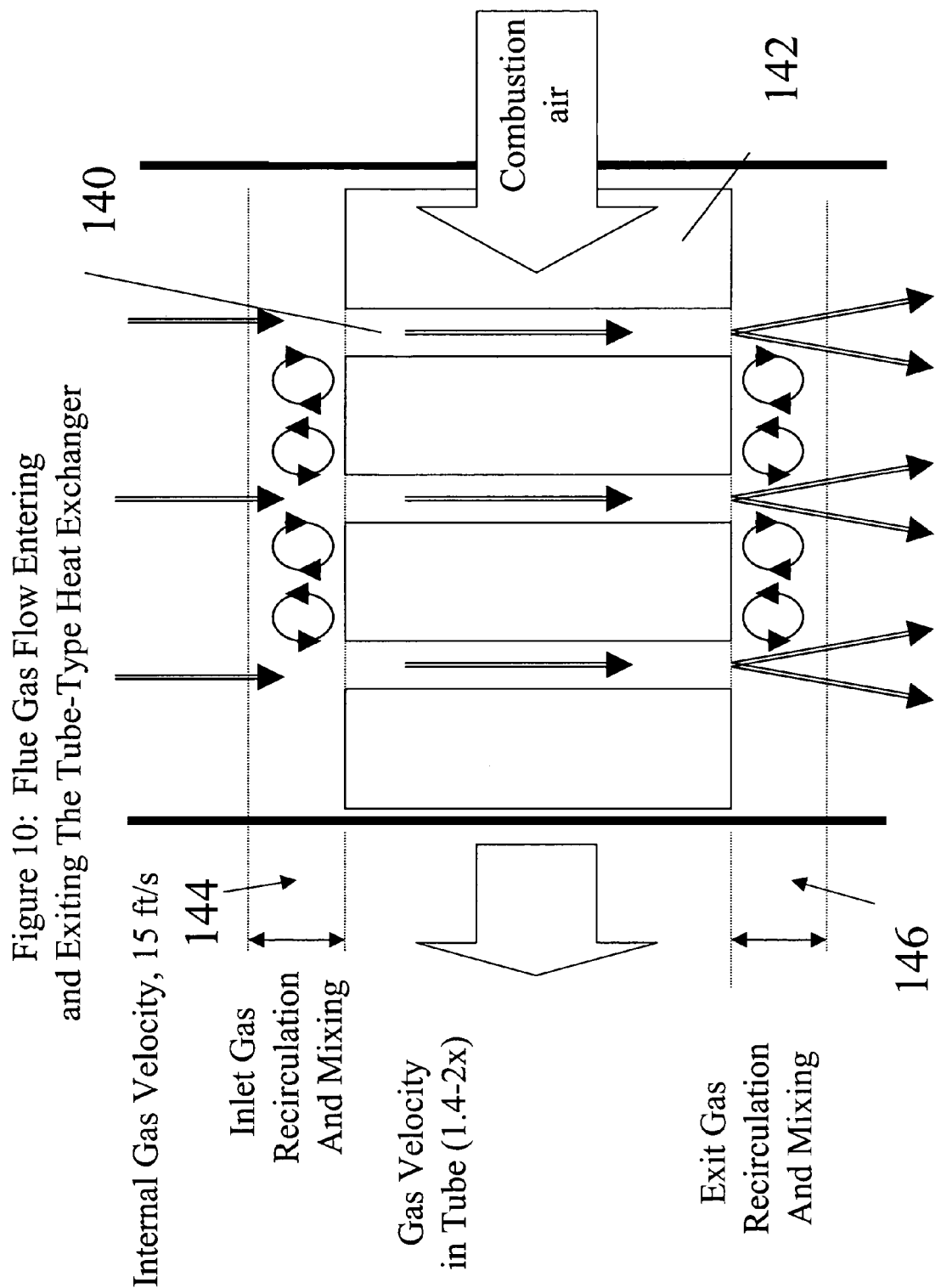
Figure 10: Flue Gas Flow Entering and Exiting The Tube-Type Heat Exchanger

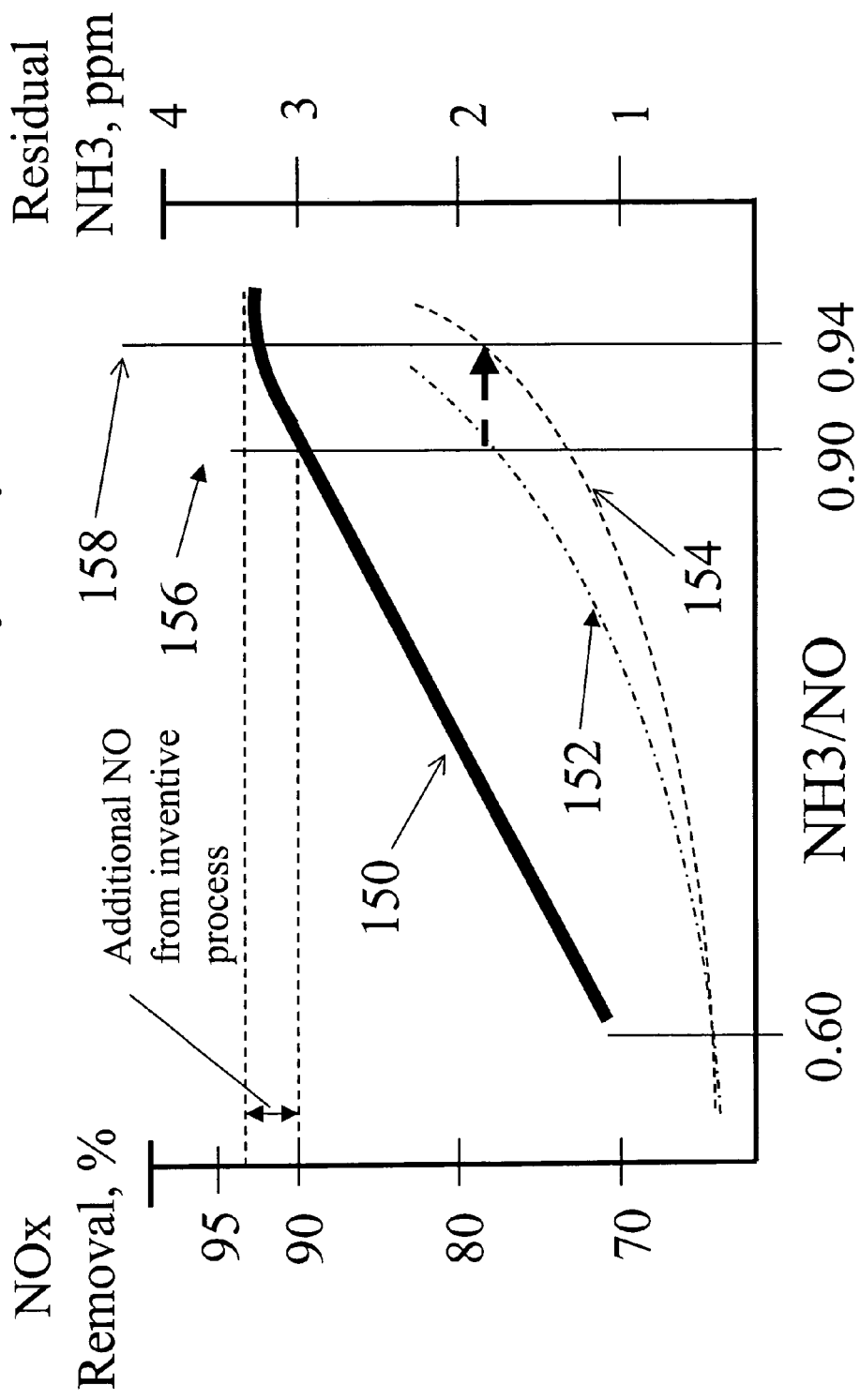
Figure 11: Improvement in NOx Removal Due To Reduction in Standard Deviation of NH3/NO After The First Catalyst Layer FIGURE 12: SCR PROCESS CONDITIONS ACROSS THE REACTOR AND EACH OF THREE CATALYST LAYERS

| | NOx Removal (%) | Residual NH3 at Nox Reduction, ppm | | Standard Deviation At Entrance to Reactor or Layer (%) | | Flue SO3 (ppm) | | ABS Onset Temp, F | |
|---|---|---|---|---|---|---|---|---|---|
| | | Conventional Design | Inventive Process | Conventional Design | Inventive Process | Conventional Design | Inventive Process | Conventional Design | Inventive Process |
| Process Inlet | | n/a | n/a | 5% | 5% | 15 | 15 | 575 | 575 |
| Layer 1 | | | | | | | | | |
| Across | | | | 15% | 10% | 21 | 21 | 450 | 400 |
| Exit | 68% | 50 | 45 | | | | | | |
| Layer 2 | | | | | | | | | |
| Across | | | | 36% | 20% | 31 | 25 | 430 | 375 |
| Exit | 19% | 12 | 7 | | | | | | |
| Layer 3 | | | | | | | | | |
| Across | | | | 47% | 28% | 45 | 29 | 375 | 360 |
| Exit | 3% | 6 | 2 | | | | | | |

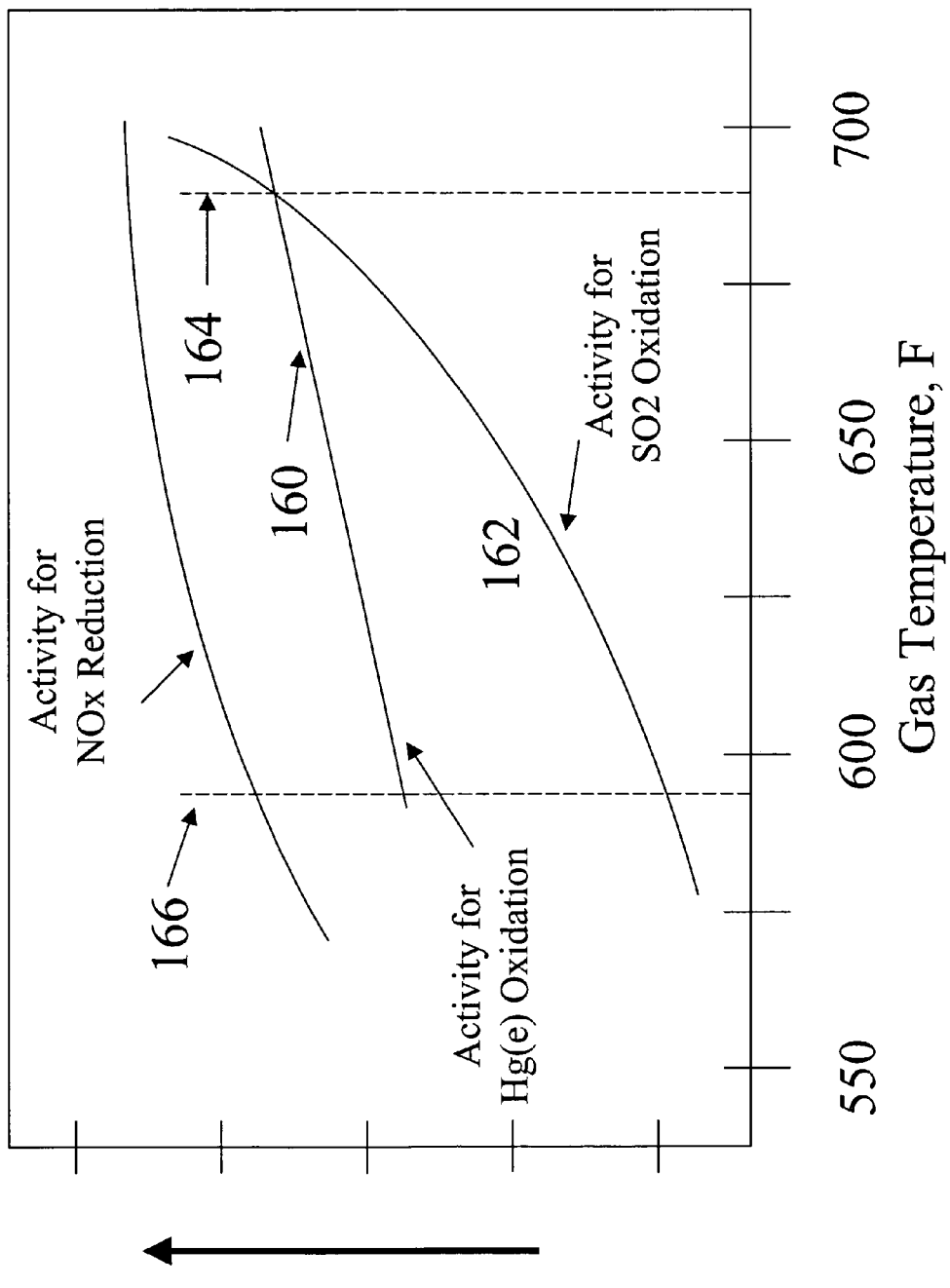
Figure 13. Relative Oxidation of Hg and SO2

MULTI-STAGE PROCESS FOR SCR OF NOX

FIELD OF THE INVENTION

The invention is related to the environmental control for removing nitrogen oxides (NOx) from combustion generated gases, and more particularly to a method and apparatus for improving the performance and reliability of selective catalytic reduction (SCR).

BACKGROUND OF THE INVENTION

A classic treatment on the removal of nitrogen oxides (NOx) from combustion generated gases using selective catalytic reduction (SCR) has been published by Bosch et. al. (1988), and more recently by Muzio et. al. (2002). Numerous patents have been awarded, with early work by Atsukawa (U.S. Pat. No. 4,302,431) typical of the initial status of the technology.

SCR is a relatively mature, well-developed environmental control technology for NOx emissions from fossil fuel fired power plants. The process has been extensively deployed internationally since the early 1970s, with approximately 80,000 MW of coal-fired boiler application at present. The first commercial SCR installations were deployed in Japan in the 1970s, initially on process heaters and refinery equipment, and subsequently on coal-fired power plants that fire by U.S. standards coal with low sulfur (0.5% or less) content. The mid-1980s witnessed the first commercial SCR applications in Europe, mostly confined to Germany, on coals typical of European usage. The origin of these coals from which European experience was generated was the Ruhr and Saar Valley in Germany, as well as Poland, South America, South Africa, Australia, and Venezuela. Most of these coals feature sulfur of 1–1.5% content. By the late 1980s, approximately 50,000 MW of SCR had been deployed on coal-fired units in Europe. In the U.S., approximately 100,000 MW of coal-fired capacity—over one third of the nations coal-fired fleet—is anticipated to be equipped with SCR by the year 2004. The range of coals utilized will be from extremely low sulfur western U.S. sources (e.g. Powder River Basin in Wyoming) to high sulfur sources such as Indiana, Pennsylvania, Ohio, Illinois and other midwestern U.S. sites.

The most problematic of these applications is for coal-fired power plants for the production of electricity, in particular those firing coals with sulfur content of 1.5% or higher. These applications are problematic due to the generation of two process byproducts. These are unreacted (residual) $NH_3$ and sulfur trioxide ($SO_3$), the former a consequence of incomplete reaction of $NH_3$ with NOx, and the latter oxidized by the catalyst from $SO_2$ in the flue gas. Both of these byproducts not only can comprise an environmental or nuisance hazard on their own, but can complicate the operation of balance-of-plant equipment. Most significantly, the oxidation of $SO_2$ to $SO_3$ has been problematic and responsible for the generation of visible plumes, receiving harsh public scrutiny (Akron Beacon Journal, 2001).

An innovative reactor design is described by Balling et. al. (U.S. Pat. No. 5,397,545) that uses a variable catalyst chemical composition to optimize the removal of NOx. Specifically, Balling et al. describe the concept of changing the composition of the catalyst in the direction of flow, thus tailoring the chemical composition to the process conditions, to "accelerate" the reaction, in this case destruction of NOx. This art also introduces deploying a method of heat removal between layers, to arrest the escalation in temperature of the gas due to a reaction. However, implementing this art does not recognize the complications of managing a multiplicity of different catalyst compositions in one reactor, or that present design criteria for high sulfur coal emphasizes the control of $SO_2$ oxidation over maximizing the rate at which NO is removed from flue gas.

In addition to NOx, mercury emissions from coal-fired power plants has received significant attention in recent years. Mercury is introduced into boiler flue gas as a trace element naturally occurring in coal. Mercury will exist in boiler flue gas in either the elemental or oxidized state, with the most prevalent oxidized form either mercuric oxide (HgO) or mercuric chloride ($HgCl_2$). The recent technical literature is replete with descriptions of investigations into control options for removing Hg from coal-fired utility flue gas (AWMA, 2001).

Tests conducted by both the U.S. government and private utilities show that most of the Hg that exists in flue gas that is in a chemically oxidized state can be removed by conventional flue gas desulfurization (FGD) process equipment, installed for $SO_2$ control. The consequences of this fact are significant—that technology installed for $SO_2$ removal will also remove Hg—but only if the Hg is oxidized from the elemental form (Hge).

The conventional deployment of an SCR process is relatively simple. FIG. 1 depicts the embodiment of an SCR process in a coal-fired power plant. Ammonia reagent ($NH_3$) is injected 18 into the flue gas stream 20 produced by a boiler 22, where the flue gas is at temperatures ranging from 550–800° F. The mixture of ammonia reagent and NOx in the flue gas reacts within a catalytic reactor 24 in the presence of one or more layers of catalyst 26 that are specially prepared to reduce the NOx to molecular nitrogen and water.

The amount of NOx removed is directly proportional to the quantity of ammonia reagent injected, indicated by the normalized ratio of the moles of $NH_3$ to the moles of NOx in the flue gas (the $NH_3/NO$ ratio). Equally important to the effective operation of the SCR process is avoiding a deleterious impact on the performance of the Ljungstrom regenerative air heater 30. This standard device, an integral component of essentially all coal-fired power plants, extracts residual heat from the flue gas before discharge through the stack. The performance of this air heater can be detrimentally impacted through residual $NH_3$ and byproduct $SO_3$, as will be described subsequently.

Of the many factors that affect SCR performance, the most important is the mixing of reagent $NH_3$ with NOx in the flue gas. Several methods are pursued to maximize this mixing and achieve greatest SCR performance. FIG. 1 shows the location of devices installed in the ductwork, known as static mixers 28, leading into the reactor to improve the mixing of injected ammonia reagent with NOx, and assure that a relatively uniform distribution of flue gas velocity and composition reports to the reactor inlet. FIG. 1 depicts a popular location for the static mixers 28, which present a variety of surfaces of various geometrical shapes and orientation that impart mixing momentum to the flue gas.

FIG. 1 depicts the arrangement of catalyst within the reactor for the case of a three layer reactor design. For any given design, the total number of catalyst layers will vary with the type of fuel, desired NO removal, time between catalyst replacement, and other factors, and is usually between 2 and 5. Usually, all available layers that are provided in the catalytic reactor, such as depicted in FIG. 1, are not initially filled with catalyst. One layer is usually retained as a "spare" and filled with catalyst once the activity of the initial inventory begins to degrade, as a means to maximize the utilization of all catalyst.

For a given SCR process design and degree of $NH_3/NO$ mixing, the second most important practical limit to SCR performance is the volume and surface area of the catalyst within the reactor. This key design variable affects the residence time available for mass transfer and reaction. Even for good $NH_3/NO$ mixing and generous catalyst surface area, a small fraction of the injected reagent $NH_3$ eludes contact with NO and migration to an active site, and thus does not react to produce the desired products of molecular nitrogen and water. The unreacted ammonia reagent is thereafter referred to as residual $NH_3$. The NOx removal achievable with a given SCR design SCR—be it 80%, 85%, or 90% or greater of inlet NOx values—is limited by the residual $NH_3$ that is introduced into the flue gas. Combined with the production of $SO_3$ from the catalyst, either or both of residual $NH_3$ and byproduct $SO_3$ can compromise the application of SCR.

In steam boilers for power generation, the SCR process is usually located as shown, between the boiler economizer section and the air heater. The temperature of flue gas at this location is well-suited for SCR application, as most boilers produce flue gas at a temperature between 500–800° F., adequate to provide the necessary catalyst activity for NOx removal. The maximum temperature at which the process can operate is determined by catalyst degradation, and a limit of 825° F. is usually observed.

The minimum flue gas temperature is determined by the flue gas sulfur trioxide ($SO_3$) content, due to the reaction of $SO_3$ with ammonia reagent in flue gas to form ammonium sulfates and ammonium bisulfates (ABS). These compounds can form at numerous locations following an SCR process, on surfaces downstream of the point of ammonia reagent injection, and as will be discussed throughout this disclosure, can be problematic for operation of both the SCR process and the power plant.

The potential to form ABS compounds on the catalyst and retard activity is of sufficient concern that boiler designers employ modifications to either the flue gas side or the steam side to insure that a minimum temperature is provided for, especially at lower loads where flue gas exiting the economizer is usually less than the values at full load. Recent contributions to the art of providing a minimum temperature for the SCR reactor at low load are taught by Cohen (U.S. Pat. No. 5,943,865), Ziegler (U.S. Pat. No. 5,775,266), and Wiechard (U.S. Pat. No. 5,555,849).

A summary of the flue gas temperatures for the onset of ABS deposits, as dependent on flue gas $SO_3$ and $NH_3$ content, is presented by "Ljungstrom Air Preheater Fouling Due To SCR Ammonia Slip" See attached reference for IDS, Counterman et. al. (1999) the subject matter of which is hereby incorporated by reference in its entirety. The highest temperatures noted (>500° F.) are those anticipated for a coal-fired power plant, due to the relatively high $SO_3$ content generated from the sulfur dioxide ($SO_2$) content by the boiler, and high NH3 concentrations corresponding to injected reagent. This temperature, defined by the relationship depicted on the third page of Counterman et al. (1999), establishes a minimum temperature "floor" for SCR operation, to prevent the deposition of ABS on the catalyst surface which will compromise NOx removal and damage the catalyst.

Process designers will modify the boiler to insure this minimum flue gas temperature is achieved at the reactor inlet, where the ABS deposition temperature is the highest that will be encountered. Subsequent to the first layer, the injected $NH_3$ will have reacted and thus decreased in concentration, reducing potential for ABS deposition until the significantly lower temperatures of the air heater are encountered.

Only recently has the ability of SCR catalyst to oxidize elemental mercury in flue gas been recognized (Laudel, 2003)). Although first noted in the technical literature 12 years ago (Gutberlet, 1992), the significance was not recognized until the Information Collection Request (ICR) issued by the U.S. EPA in 1998–1999 was conducted to establish baseline mercury emissions from coal-fired power plants. Data from this program is in the public domain (EPA, 2000), and has been evaluated to provide insight as to how mercury can be controlled.

A number of investigations have attempted to isolate and measure the role of the SCR catalyst in increasing the oxidation of Hg in flue gas. Data suggests this trend is not always significant and consistent, and that many factors other than the SCR catalyst may be responsible. Among these factors is flue gas temperature, as Downs and co-workers at McDermott Technology Inc. have reported that operation of the catalyst at lower temperature may promote the oxidation of Hg from the elemental to the oxidized state (Downs, undated).

Accordingly, the potential to use SCR as a proactive method to assist mercury control by promoting removal in FGD equipment is a new and still evolving concept. Prior to this disclosure, there has not been a proactive effort described to design an SCR process specifically to promote mercury removal.

Several key design and operating factors affect the performance and operation of SCR process equipment, for which a typical relationship is summarized in FIG. 2. These factors, which as will be shown can limit the usefulness of the SCR process, are favorably affected by the inventive process. These factors are the generation of residual $NH_3$ and byproduct $SO_3$, which can significantly interfere with plant operations, as chronicled in early commercial U.S. SCR applications on higher sulfur coal (ref Gavin).

FIG. 2 presents the key NOx control performance data, depicting the NOx removed and residual $NH_3$ reagent introduced into the flue gas by the process. Specifically, FIG. 2 shows the typical approximate linear relationship between NOx removal (32, as indicated on the left y-axis) and $NH_3/NO$ ratio, shown on the x axis 34. The value of NOx removal is shown as an approximate linear relationship (36), and the amount of residual $NH_3$ byproduct introduced into the flue gas on the right y axis (38).

Also shown in FIG. 2 is the residual $NH_3$ values achieved in exchange for this NOx removal. The value of residual $NH_3$ will vary with remaining catalyst activity and thus lifetime, and is shown for three typical catalyst lifetimes: 10,000 hours 40, 16,000 hours 42, and 24,000 hours 44. The relationship depicted in FIG. 2 is for a hypothetical case of 200 ppm inlet NOx, but applies in principal to a wide range of process conditions.

FIG. 2 shows that almost any level of NOx removal can be attained—up to and approaching 95% of inlet values—depending on the level of unreacted $NH_3$ in flue gas that can be tolerated. The key to controlling the residual $NH_3$ is to maximize the mixing of injected reagent with flue gas, and the evolution of SCR technology is replete with attempts to maximize this mixing.

Most recently, a concept for a sophisticated injection system to insure balance between the injected reagent and combustion product gases has been applied for by Rogers et. al. (U.S. Patent application 200330003029). As a further example of methods to improve this mixing, an injection grid has been described by Anderson et. al. (U.S. Pat. No. 5,988,115). An approach that is gaining widespread acceptance is the use of the static mixers that were shown in FIG. 1, which are important not only for stationery SCR applications as described by Henke (U.S. Pat. No. 4,737,345), but for mobile applications of SCR, as described by Hoffman et. al. (U.S. Pat. No. 6,553,755). Humsetal et. al. (U.S. Pat. No. 6,287,524) has devised methods to increase turbulence in the region of reagent injection to improve mixing. All of these approaches and others found in the literature teach improving mixing before entry into the reactor, but they do not address improving mixing once the flue gases have progressed beyond the first catalyst layer.

For most coal-fired boilers the concentration of unreacted $NH_3$ that can be tolerated is limited to just 2–3 ppm, due to impact on balance-of-plant equipment such as the Ljungstrom air heater and other operating equipment. Accordingly, although in concept $NH_3$/NO can be injected to achieve 95% NOx removal, practical limitations that restrict residual $NH_3$ to 2–3 ppm constrain NOx reduction to 85–90%. Significantly, FIG. 2 also shows that the residual NH3 generated depends on the catalyst lifetime, as residual $NH_3$ increases as catalyst lifetime increases from 10,000 hours 40, to 16,000 hours 42, to 22,000 hours 44.

The actual $NH_3$/NO ratio entering any catalyst layer is not a single value, but a distribution of values, each of which can significantly deviate from the average. SCR equipment is designed to meet a process specification, which defines among other factors the variance in flue gas concentration of $NH_3$/NO and other key process factors, such as NOx, flue gas temperature and the distribution of velocity at the inlet of the reactor. This variance is usually defined in terms of the standard deviation of a set of values from a mean.

For any given process specification, catalyst of sufficient volume and composition is provided to remove NO and control unreacted $NH_3$ reagent from flue gas, at a specified temperature. As an example, an SCR process specification may require a certain performance target from flue gas with an average velocity distribution of 15%, and $NH_3$/NO distribution of 6%, and temperature variance of 30° F.

In general, the most important of these SCR variables is the distribution of $NH_3$/NO. The significance of high standard deviation in $NH_3$/NO is that it creates local zones both less and greater than the $NH_3$/NO ratio required to react. Specifically, a portion of these local zones in the reactor will experience extremely low $NH_3$/NO ratio, well below the mean value, and other portions of the reactor will experience $NH_3$/NO ratio above the mean. Both contribute to compromised performance. The lower value $NH_3$/NO zones do not maximize the use of the catalyst, and the higher value $NH_3$/NO zones provide excess reagent over the quantity of NO injected. This $NH_3$ reagent in excess of the NO in the flue gas cannot react, and will generate residual $NH_3$ and thus limit the operation of the entire process.

The influence of changes in the standard deviation of $NH_3$/NO is shown in FIG. 3, showing the relationship between NOx removal achieved 50 and residual $NH_3$ 52, for the specified case of 200 ppm inlet NOx, flue gas temperature of 700° F., inlet reactor $NH_3$/NO ratio of 0.91. The data in FIG. 3 shows that if 5% standard deviation of $NH_3$/NO can be achieved 54—reflecting good mixing—NO removal of about 90% can be achieved for a residual $NH_3$ limit of 2 ppm. Conversely, if the standard deviation of $NH_3$/NO is only 10% 56—then NOx removal is limited to about 86% for a residual $NH_3$ limit of 2 ppm. FIG. 3 demonstrates why SCR process designers utilize static mixers and other means to minimize $NH_3$/NO standard deviation in selecting process design.

FIGS. 2 and 3 depict process inlet and outlet data, but do not describe process conditions across each layer that limit SCR performance. A significant characteristic of the SCR process is the progression of NOx removal and consumption of $NH_3$ through the catalytic reactor. FIG. 4 presents data describing how key variables change across each layer of a three layer reactor, calculated for an example case similar to that of FIG. 3. FIG. 4 presents example calculations for an inlet NOx concentration of 200 ppm, operating at an $NH_3$/NO ratio of 0.91, and achieving a 90% NOx removal. The key variables shown are NO removal, the $NH_3$/NO ratio, and the standard deviation of $NH_3$/NO ratio, at the inlet of a conventional design reactor. FIG. 4 also shows how these key variables change across each layer. FIG. 4 shows that 68% of the NOx is removed across the first layer, 19% across the second layer, and only 3% across the last layer. In fact, due to the relatively small amount of NOx removed across the last layer, its purpose as limited by conventional SCR design is as much to reduce unreacted $NH_3$ to negligible levels, as contribute to NO removal. Of note is that the $NH_3$/NO ratio calculated for each of the three layers decreases through the reactor. The first layer is exposed to an $NH_3$/NO ratio equivalent to the inlet of the process reactor—in this case 0.91.

However, the simultaneous consumption of ammonia and NOx lowers the $NH_3$/NO ratio to 0.72 at the exit of the first layer, which corresponds to the inlet $NH_3$/NO of the second layer. This same pattern continues, with $NH_3$/NO leaving the second layer and thus entering the third layer as 0.31. Consequently, the last catalyst layer, although contributing equally to the capital and operating cost of the process as much as the first layer, contributes relatively little NOx removal.

Significantly, as the reaction progresses through each layer in the catalytic reactor, small deviations in $NH_3$/NO in the first layer translate into large deviations in $NH_3$/NO in subsequent layers. FIG. 4 shows the deviation in $NH_3$ that is observed at the reactor inlet, based on a 5% standard deviation at the reactor inlet. For these process conditions, the magnitude of the 5% unmixedness equates to about a 9 ppm excess or deficit of reagent at any point. This deviation is unchanged at 9 ppm as the reaction proceeds, but the fraction this 9 ppm of NH3 represents of remaining NO increases. Accordingly, for the example case, the standard deviation of the $NH_3$/NO ratio entering the second and third layer increases, respectively, to 14 and 35%.

Thus, the practical NOx removal is limited by the ability to contact essentially all injected ammonia reagent with NOx, at an active catalyst site.

In general, most SCR catalysts oxidize from 0.5 to 3% of the $SO_2$ contained in the flue gas to $SO_3$. FIG. 4 included an estimate of the increase in $SO_3$ content across each layer for the example case. This extent of oxidation is dependent on the features of the catalyst, and the volume of catalyst applied.

Conventional practice allows for both catalyst and process design to minimize the conversion of $SO_2$ to $SO_3$. Some catalyst suppliers substitute for vanadium other active materials such as molybdenum that can provide NO removal (although less than compared to vanadium) but minimize $SO_2$ oxidation. In this way, $SO_2$ conversion can be reduced from 2% or greater to less than 1%. However, a larger catalyst volume to provide the same NO removal is usually required, to compensate for the lower activity with respect to NO removal.

The second method to control $SO_2$ conversion is lowering reactor operating temperature. FIG. 5 presents a typical relationship describing $SO_2$ oxidation rates for a commercial catalyst as a function of flue gas temperature. As shown, the rate of $SO_2$ conversion 60 is strongly dependent on flue gas temperature 62, with a reduction by 50° F. lowering the conversion rate by almost a factor of two 64 to 66. This relationship is exploited by process designers in minimizing $SO_2$ conversion for a particular application. Several commercial process designs have been noted where the boiler is modified so that the flue gas in the economizer exit section—where the SCR process is installed—is lowered by 50 to 75° F., thus mitigating $SO_2$ conversion.

The detailed physics of $SO_2$ to $SO_3$ oxidation suggests that, similar to the case of NO removal and ammonia reagent consumption, process conditions across each layer can vary significantly. Knowledge of this layer-by-layer variation can be exploited to provide a low $SO_2$ conversion reactor compared to conventional reactor design. Specifically, statistical thermodynamics dictates that all reactants in flue gas, such as NO, $NH_3$, $SO_2$, and $O_2$—compete with each other (as well as background species of $CO_2$, $H_2O$, etc.) for access to active catalyst sites. Accordingly, the depletion of NO and NH3 improves access of $SO_2$ to an active site, increasing $SO_2$ oxidation. This phenomena has been observed in the laboratory and at pilot scale—that $SO_2$ conversion is higher where the concentration of NO and $NH_3$ are relatively low. At laboratory scale, tests conducted by Svachula (1993) measured the influence on $SO_2$ oxidation of a large number of process variables. FIG. 6 shows the experimental relationship between $SO_2$ oxidation on the left-y axis 70 and $NH_3$/NO ratio on the x-axis 72. Data in this figure shows that $SO_2$ oxidation, at low values of $NH_3$/NO ratio such as 0.2 74, is about a factor of two greater than $SO_2$ oxidation when $NH_3$/NO ratio is at typical operating levels of 0.80 76.

These experiments suggest that as flue gas passes through the reactor, each catalyst layer contributes an increasing conversion of $SO_2$ to $SO_3$ to the entire process. The last layer, where the concentration of $NH_3$ and NO is the lowest, contributes the most to the overall reactor oxidation of $SO_2$.

FIG. 4, in addition to summarizing NO and $NH_3$ concentration within a reactor, also reported the increase in $SO_3$ content across each layer, based on trends identified by Svachula. Specifically, FIG. 4 assumed the $SO_2$ oxidation is 0.3%, 0.5%, and 0.7% for the first, second, and third layer, respectively. The amount of $SO_3$ across each catalyst layer is shown, based on the amount created across each layer, added to the inlet values produced by the boiler. Also shown is the temperature of deposition of ABS for each layer, as dependent on the $NH_3$ and $SO_3$ in the flue gas. This data shows that the ABS deposition temperature decreases with each layer. The highest ABS deposition temperature is for the first layer, and this establishes the minimum reactor operating temperature, for the conventional SCR design.

The generation of residual $NH_3$ and byproduct $SO_3$ from SCR can adversely impact operation of the entire power station.

Of note is that introduction of residual $NH_3$ by itself into the flue gas in quantities typical of SCR does not necessarily cause harm. There are possible environmental impacts, but these appear to be at concentrations well above those typical for flue gas at the SCR process exit. However, the secondary impacts on power plant and balance-of-plant equipment are of considerable concern. For residual $NH_3$ these are contamination of ash and air heater plugging, and for $SO_3$ air heater plugging from ammonium sulfates and bisulfates and materials corrosion.

Residual $NH_3$ will be absorbed onto the fly ash, and can compromise the sale of fly ash for construction supplement, or acceptable disposal. Early experience (1980–1985) in Japan suggested that limiting unreacted $NH_3$ in flue gas to 5 ppm minimized absorption of ammonia by fly ash and avoided these problems. However, this threshold—established for the types of coals fired in Japan—was not adequate for the conditions of application in Europe. German experience (1986 and after), consistent with early lessons from the first operating U.S. applications (1991 and on), showed that depending on the particular use for fly ash, the flue gas residual $NH_3$ should not exceed 2 ppm. This lower flue gas content maintained ammonia concentration in the ash generally below 100 ppm. Accordingly, the generally accepted design threshold for flue gas residual $NH_3$ was modified in the late-1980s to be 2–3 ppm. This design limit has been applied to the majority of U.S. installations, and maintaining residual $NH_3$ below this limit (along with avoiding air heater plugging, as discussed in the next section) establishes when either NO removal must be compromised, or catalyst added or exchanged.

The immediate and significant consequence of flue gas $SO_3$—as formed either inherently in coal-fired systems or augmented by the presence of SCR—is the production of ammonium sulfates and bisulfates from residual $NH_3$ and byproduct $SO_3$. As described previously, ammonium sulfates and bisulfates can form in the reactor, and specifically are most prone to form on the first layer where the injected $NH_3$ concentration is high. The flue gas temperatures where the deposition can occur have been previously described in FIG. 4. Once the injected $NH_3$ reacts and the concentration is reduced, ammonium sulfates and bisulfates are less likely to form at the temperatures typical of an SCR reactor (640–700 F), but could form as the flue gas cools to 400–500 F as it passes through the Ljungstrom heat exchanger.

FIG. 7 represents a conventional Ljungstrom air heater for use in power boilers. The purpose of this device is to recover the last amount of usable heat prior to entry of the flue gas to the environmental control system. Flue gas enters a heat exchanger shell 80, that is split in two sections, segregating flue gas exiting the boiler from combustion air entering the boiler. The gases pass through three stages of heat exchange elements that are aligned in the direction of flow. These heat exchange elements are assembled as "baskets" that can be easily removed and replaced, and are essentially a series of plates spaced to allow flue gas flow with minimal pressure drop but the necessary heat transfer characteristics. The three stages of the heat transfer baskets are: the "hot" 82, "intermediate" 84, and "cold" 86 sections. These baskets rotate at approximately 1 rpm between the flue gas and combustion air sections. Hot flue gases from the boiler give up heat to the baskets, which retain this heat and rotate into the combustion air, subsequently increasing the temperature of the combustion air on the way to the boiler.

Essentially all commercial boilers for power generation utilize such a device, and in excess of 90% employ the Ljungstrom-type design. The major design variant is whether the axis of rotation of the heat exchange material is horizontally or vertically configured. The device usually lowers the flue gas temperature from approximately 575–725° F. (the specific value depending on boiler design and coal composition) to 350–275° F., transferring the heat to the incoming combustion air, and improving the combustion process. To maintain reliable and effective performance, the heat exchange materials or "baskets" should remain clean and unobstructed, otherwise the flue gas pressure resistance will increase beyond the design capability, restricting the maximum flue gas flow rate and thus boiler power output.

FIG. 8 shows in more detail the three elements of the heat transfer surfaces: the "hot", "intermediate", and "cold" sections. These surfaces are generally kept clean through the use of "sootblowing", in which a high pressure (100 psig) pulse of cleaning media (usually steam from the boiler) is injected across the face of the surfaces. The sootblowing lances can be located at either the hot-end 96 and thus inject cleaning media in the direction of flue gas flow, or the cold-end 98 and thus inject cleaning media against the direction of flue gas flow. The steam or other cleaning media is injected via nozzles that are swept across the inlet of the baskets, covering the entire cross-section in 1–3 minutes. The frequency with which this cleaning process is repeated varies widely, from several times per day to once per month, depending on the type of coal fired, and boiler design.

Each of these heat exchange sectors is characterized by a different flue gas temperature range. The hot section generally lowers the flue gas from the reactor inlet values of 575–725 to 500–575° F. At these relatively high temperatures there is little opportunity for formation of ABS compounds, and subsequent deposition on heat exchange surfaces. Accordingly, the materials chosen for fabrication of the hot-end baskets 90 can be lower cost conventional steels, and the spacing of plates can be minimized, to maximize heat transfer without concern for plugging. The intermediate baskets 92 lower flue gas temperature from 500–575 to 400–450° F. In this section, the opportunity for deposition and plugging induced by lower temperatures improves, thus materials for some applications should be constructed of corrosion-resistant alloys. Also, the spacing between plates may be required to be increased, to minimize the opportunity for plugging passageways. The cold-end baskets 94, as the last element, lowers flue gas from 400–450 F to the exit of 275–350 F, depending on the fuel and design of the boiler. It is this cold end section that experiences the most aggressive conditions with respect to plugging by deposition of ABS, as well as $SO_3$ deposition to form condensed sulfuric acid. It should be noted the cited temperature ranges are approximate, and individual applications can vary depending on boiler performance and coal composition.

Research during the early period of SCR evolution showed that residual $NH_3$ from SCR will combine with $SO_3$ in the flue gas to form ammonium sulfates and bisulfates at the interface of the intermediate and cold-end sections, as depicted in FIG. 8. The occurance of these deposits at this interface appears to be a consequence of both the temperature and physical conditions of ammonium sulfates and bisulfates formation, and the effectiveness of the cleansing from sootblowing activities. Specifically, it is believed that deposits occur at the interface of the intermediate and cold ends sections because the "void" between the two sections allows the high energy cleansing jet of steam or other cleaning media to expand, diffusing the cleaning momentum into the void, thus compromising the ability to maintain the surfaces clean. A solution tried with some success is integrating the intermediate and cold sections into a single combined intermediate/cold section. The advantage of the combined cold/intermediate section is that eliminating the void between the intermediate and cold-end sections prevents the sootblower medium from diffusing and compromising cleaning momentum. The details of this mechanism have never been proven, but experience with one piece, intermediate/cold-end baskets on SCR-equipped units demonstrates these surfaces can help minimize, but not completely eliminate, accumulation of ammonium sulfates and bisulfates.

The reason why air heater deposition problems are not completely eliminated but persist with units equipped with a one piece intermediate/cold-end section is that the sootblowing media must still traverse the void between the hot-end and the one piece intermediate/cold sections. This remaining void can still dissipate the sootblowing media momentum, compromising cleaning ability. Ideally, a one piece heat exchange element combining the hot, intermediate, and cold-end sections could minimize or even eliminate the dissipation of sootblowing momentum. However, manufacturing limitations prevent such a one piece element from being constructed, at least for a cost that is competitive with the present approach. A number of technical and cost barriers prevent configuring all three sections (hot/intermediate/cold) into a one piece element. Recent contributions to the art of air heater design by Fierle et. al. (U.S. Pat. No. 6,260,606) are typical of attempts to mitigate the accumulation of ABS in the cold end section, as are the techniques described by Bondurant (1999).

SUMMARY OF THE INVENTION

In some embodiments, this invention is directed to a selective catalytic reduction apparatus, comprising at least first and last catalyst layers in series for reducing nitrogen oxides in a flue gas; at least one interstage heat exchanger located after the first layer and before the last layer, that lowers flue gas temperature, and that acts as a mixing body to lower the standard deviation of the $NH_3/NO$ ratio entering catalyst layers after the first catalyst layer, thus providing better consumption of both ammonia and NOx in the reactor than would be achieved in the absence of the at least one interstage heat exchanger.

In some embodiments, this invention includes, in addition to said first and last catalyst layers, a second catalyst layer, wherein the at least one interstage heat exchanger is located between the second and third catalyst layers.

In some embodiments, this invention includes, in addition to said first and last catalyst layers, a second catalyst layer and a third catalyst layer, wherein the at least one interstage heat exchanger is located between the first and second, second and third, or third and last catalyst layers.

In some embodiments, this invention includes, in addition to said first and last catalyst layers, a second catalyst layer, a third catalyst layer and a fourth catalyst layer, wherein the at least one interstage heat exchanger is located between the first and second, second and third, or third and fourth, or fourth and last catalyst layers In some embodiments of this invention, the catalyst composition is not altered to accelerate or decelerate any reactions.

In some embodiments of this invention, 50–175° F. of temperature are transferred out of the flue gas by the heat exchanger located between catalyst layers.

In some embodiments, this invention includes a compressed depth Ljungstrom air heater with a semi-continuous two piece air heater basket, or a continuous one piece air heater basket.

In some embodiments of this invention, the apparatus is configured to utilize a $NH_3/NO$ ratio approaching unity.

In some embodiments, this invention includes at least one additional mixing device located between at least two catalyst layers to further mix reagent and NO.

In some embodiments of this invention, the additional mixing device is a static mixing device.

In some embodiments of this invention the static mixing device is a perforated plate or plates.

In some embodiments, this invention includes an additional layer to a special-purpose catalyst for oxidation of mercury, of a composition such that the lower temperature decreases the SO2 conversion significantly, but only marginally decreases or does not affect the mercury oxidation, said special-purpose catalyst not being a proportional change in concentration of the ingredients of a conventional SCR catalyst, said special-purpose catalyst having a formulation preferential to Hg oxidation.

In some embodiments of this invention, the additional layer of special-purpose catalyst comprises carbon, material formed from fly ash, and/or at least one palladium-based compound.

In some embodiments, this invention includes a combustion air bypass duct controlled by a modulating damper to direct combustion air leaving a compressed, one stage air heater directly to a boiler thus bypassing the interstage heater after the first catalyst layer, while retaining a minimum amount of air in the interstage heater exchanger to avoid overheating of tubes, to preserve the gas temperature in the first catalyst layer above a minimum required to avoid ABS deposition, for use at lower loads or at a full load.

In some embodiments, this invention is directed to a method for the selective catalytic reduction of nitrogen oxides, comprising: introducing a reducing agent into a flue gas containing nitrogen oxides; then passing the flue gas through at least a first layer of nitrogen oxide reducing catalyst where an amount of nitrogen oxides in said flue gas is reduced; then passing the flue gas through a heat exchanger that removes heat from the flue gas and also mixes the flue gas and the reducing agent; and then passing the flue gas through at least one additional layer of nitrogen oxide reducing catalyst where an additional amount of nitrogen oxides in the flue gas is reduced.

In some embodiments of this invention, the at least one heat exchanger is at least one interstage heat exchanger, that lowers flue gas temperature, and that acts as a mixing body to lower the standard deviation of the $NH_3/NO$ ratio entering catalyst layers after the first catalyst layer, thus providing a higher amount of consumption of both ammonia and NOx in a reactor than would be achieved in the absence of the at least one interstage heat exchanger.

In some embodiments of this invention, the at least one interstage heat exchanger transfers 50–175° F. of heat; and comprises utilizing a one-piece heat exchange element in a Ljungstrom-type heat exchanger, and wherein ammonium sulfates and ammonium bisulfates are cleaned from air heater surfaces with sootblowers located at both the inlet and outlet of the air heater.

In some embodiments of this invention, the reducing medium is ammonia and the NH3/NO ratio is between 0.90 and 0.98.

In some embodiments of this invention, the $NH_3/NO$ ratio is about 1:1.

In some embodiments, this invention includes, before passing the flue gas through the at least one additional catalyst layer, passing the flue gas through a separate static mixing device to mix reducing agent and NO, further mixing the partially reacted $NH_3$ and NO.

In some embodiments, this invention includes passing the flue gas through at least one additional layer of a special-purpose catalyst for oxidation of mercury, said special-purpose catalyst not representing a proportional change in concentration of the ingredients of a conventional SCR catalyst, said special-purpose catalyst having a formulation preferential for Hg oxidation In some embodiments, this invention includes passing a portion of the flue gas through a combustion air bypass duct controlled by a modulating damper to direct combustion air leaving a compressed, one stage air heater directly to a boiler thus bypassing the interstage heater after the first catalyst layer, while retaining a minimum amount of air in the interstage heater exchanger avoiding overheating of tubes, preserving gas temperature in the first catalyst layer above a minimum required to avoid ABS deposition.

In some embodiments of this invention, a lower flue gas temperature by a magnitude of 50 to 175° F. lowers the oxidation of $SO_2$ across each layer by a factor of 50–150%, and/or increases the oxidation of mercury across each layer by a value of 20 to 150%, both compared to the rate that would normally be observed without the reduced flue gas temperature.

In some embodiments, this invention is directed to a selective catalytic reduction apparatus, comprising at least first and last catalyst layers in series for reducing nitrogen oxides in a flue gas; at least one interstage tube heat exchanger located after the first layer and before the last layer, that lowers flue gas temperature, and that acts as a mixing body to lower the standard deviation of the $NH_3/NO$ ratio entering catalyst layers after the first catalyst layer, thus providing better consumption of both ammonia and NOx in the reactor than would be achieved in the absence of the at least one interstage tube heat exchanger.

In some embodiments, this invention is directed to a selective catalytic reduction apparatus, comprising at least first and last catalyst layers for reducing nitrogen oxides in a flue gas; at least one interstage static mixer located after the first layer and before the last layer, that acts as a mixing body to lower the standard deviation of the $NH_3/NO$ ratio entering catalyst layers after the first catalyst layer, thus providing better consumption of both ammonia and NOx in the reactor than would be achieved in the absence of the at least one interstage static mixer.

BRIEF DESCRIPTION OF THE DRAWINGS

FIG. 1 is a sectional side view of the application of conventional SCR to a coal-fired boiler, showing the flue gas path from the furnace through the air heater FIG. 2 presents the fundamental SCR performance relationship between the injected ammonium reagent, and the NOx removal derived (on the left axis) and the residual NH3 produced (on the right axis).

FIG. 3 presents the relationship between NOx reduction and residual NH3 produced, for a given SCR process, for a fixed set of design conditions, as a function of the maldistribution of flue gas velocity entering the reactor, as measured by the standard deviation of the variation.

FIG. 4 shows the SCR process conditions across a three layer catalyst reactor, for a conventional design reactor, depicting the change in process conditions across each layer, and how the NOx removal performance and control of $SO_2$ oxidation compromise across each layer.

FIG. 5 depicts the relationship between $SO_2$ oxidation by the SCR catalyst, and the flue gas temperature.

FIG. 6 describes the fundamental relationship between SO2 oxidation and NH3/NO ratio at the catalyst surface, based on bench-scale data.

FIG. 7 presents a sectional cross section of a Ljungstrom-type air heater, showing both the flue gas and combustion air sides, and the three sections of heat exchange material.

FIG. 8 provides additional detail for the heat exchange surfaces contained within the Ljungstrom-type air heater, showing the location of sootblowers for cleaning the surfaces, and the usual zone of deposition of ammonium sulfates and bisulfates.

FIG. 9 is a sectional side view of the application of the inventive process to a coal-fired boiler, showing the flue gas path from the furnace, through the first reactor layer, the interstage heat exchanger and mixing surfaces, the final reactor layers, and the compressed Ljungstrom-type air heater.

FIG. 10 is a section of the interstage heat exchanger, showing the path of flue gas and combustion air flow, and the zones of flue gas recirculation both entering and exiting the heat exchange, which serves to induce additional mixing.

FIG. 11 compares for the inventive process the fundamental performance relationship between the injected ammonium reagent, and the NOx removal derived (on the left axis), and for both the conventional and inventive concepts the residual $NH_3$ produced (on the right axis), and how the lower residual ammonia from the inventive process allows operation at a higher NH3/NO ratio.

FIG. 12 shows the SCR process conditions across a three layer catalyst reactor, comparing both the conventional and inventive design reactor, depicting the change in process conditions across each layer, and how the NOx removal performance and control of $SO_2$ oxidation compromise across each layer.

FIG. 13 shows the relationship between the oxidation of elemental mercury and sulfur dioxide in a coal-fired boiler flue gas, as a function of flue gas temperature, for any number of commercial or developmental catalysts, showing how a modest reduction in flue gas temperature lowers SO2 oxidation but not mercury oxidation.

DETAILED DESCRIPTION OF THE INVENTION

The innovation to this concept that is the subject of this disclosure provides benefits beyond the conventional approach described in these references in three ways. First, the removal of nitrogen oxides (NOx) increases. Second, the production of secondary and byproduct species is reduced, improving the reliability and applicability of the process. Third, the innovation promotes the control of mercury (Hg) emissions from coal-fired powerplants, without an accompanying deleterious impact that compromises broad use of this technology.

SCR technology could benefit from an improvement, as described in this disclosure, to simultaneously reduce one or both of the undesirable process byproducts, and improve the tolerance of balance-of-plant equipment to these byproducts. The ability to oxidize mercury from the elemental state to the oxidized state without producing undesirable byproducts such as $SO_3$ is a further feature of the inventive process. The conventional application of SCR—operating at process temperatures of 600–700° F. and using standard catalysts—is known to prompt this oxidation of elemental mercury to the oxidized state (Laudal, 2003), but is also believed to simultaneously increase the oxidation of $SO_2$ to $SO_3$. As a consequence, any attempt to apply conventional SCR technology to further the oxidation of mercury will be accompanied by an increase in $SO_3$, which as described previously can be problematic to both plant operations and in generating visible plumes. The inventive process offers a way of oxidizing elemental mercury to enhance capture by FGD equipment, but without promoting $SO_2$ oxidation to $SO_3$.

The SCR process and apparatus can employ any of several types of catalyst, and the basis of the proposed inventive process described herein does not depend on any particular catalyst type. Catalyst is commercially available from numerous suppliers around the world, and although not identical the features of most catalyst are similar. Most catalysts employ vanadium pentoxide as the active ingredient, stabilized in a base material that is primarily titanium dioxide. Each of the commercial catalyst suppliers employ a proprietary composition, additives, material processing techniques, and manufacturing techniques that are intended to improve the "activity" of the catalyst for NO removal, while minimizing the cost, and flue gas flow resistance. In addition, each supplier will include either a trace chemical additive or physical feature that minimizes the oxidation of $SO_2$ to $SO_3$. The technology of honeycomb catalysts was described in an early disclosure by Atsukawa (U.S. Pat. No. 4,282,115). Recent improvements as described by Kobyashi (U.S. Pat. No. 5,128,301) are typical. Other recent contributions to the art of catalyst technology utilizing primarily titanium dioxides, vanadium pentoxide, and select additives are described by Vogel (U.S. Pat. No. 5,225,390). In addition to the previously cited compounds, other categories of catalyst composition exist, such as using zeolites, as disclosed by Farnos (U.S. Pat. No. 5,451,387). Further, a method of using the family of vanadium pentaoxide active materials on a unique substrate has been disclosed by Kato et. al. (U.S. Pat. No. 5,348,987). Still other variants of using vanadium as the primary active component in conjunction with molybdenum and nickel have been recently developed by Ku et. al. (U.S. Pat. No. 6,171,566). In summary, a wide variety of catalyst composition exists, with the most common choice to date the use of vanadium stabilized in titanium oxide. For both the honeycomb-type and plate-type catalyst geometry, innovations are constantly being derived, such as by Hums et. al. (U.S. Pat. No. 6,287,524).

As mentioned above, the practical NOx removal is limited by the ability to contact essentially all injected ammonia reagent with NOx, at an active catalyst site. The inventive process solves this problem by improving the uniformity of $NH_3$/NO after the first layer, to improve NO removal in subsequent layers of the reactor.

This invention provides an additional method to mitigate $SO_2$ oxidation to $SO_3$, that is not available utilizing the conventional process design.

A consequence of this invention is eliminating the need for the hot-end in a Ljungstrom-type air heater. This invention, by reducing the total depth of heat exchange material required, will improve access for sootblowing that will maintain the air heater clean.

FIG. 9 depicts a schematic of an embodiment of a process and apparatus in accordance with this invention, identifying several features that distinguish this invention from conventional SCR technology. FIG. 9 shows the boiler 124, SCR reactor 126, and air heater 130 in a similar configuration as the conventional design. Flue gas 122 is generated by the boiler, and ammonia reagent is injected 120 similar to the conventional approach. Three layers of catalyst are used in this example, the same as in the conventional process design. In embodiments of this invention, a significant change is that the heat removal surface corresponding to the hot-end section of the Ljungstrom air heater has been eliminated, and is replaced with a separate heat exchanger 132 located between the first and second catalyst layer. A conventional tube-type heat exchanger (flue gas flowing within the tubes, combustion air flowing outside the tubes), for example, is integrated into the reactor between these two catalyst layers. This invention allows SCR equipment design and process conditions to be modified as follows:

Air Heater

The heat exchanger located following the first catalyst layer will be designed to reduce flue gas temperature by an amount that will significantly mitigate the $SO_2$ oxidation. The extent of flue gas temperature reduction by this heat exchanger will vary significantly with reactor design and fuel properties, and is anticipated in many cases to be 50–175° F., and usually approximately 100° F. Accordingly, with this first phase of heat removal accomplished within the reactor, the Ljungstrom air heater (130 of FIG. 9) need now only employ an intermediate and cold-end section, which can be constructed in one integrated piece. Referencing FIG. 8, the hot-end basket 90 is eliminated, and the intermediate 92 and cold-end 94 baskets are combined into a single piece basket. As a consequence, the one piece continuous element conveys sootblowing media momentum to the deposition zone, without dissipation, which improves the ability to keep surfaces clean. The most significant advantage of utilizing the one piece intermediate/cold end section is eliminating the void created between the hot-end and the intermediate section (93 in FIG. 8), which as described previously is believed to attenuate the effectiveness of the sootblowing media. The combined intermediate/cold end section will improve cleanability of the heat transfer surfaces, reducing the escalation of flue gas pressure drop due to ammonium sulfates and bisulfate accumulation, and thus avoid periods of limited load operation. The improved cleanability can optionally be used, as described later, to remove residual NH3 through reaction with $SO_3$ to form ammonium sulfates and bisulfates, thus eliminating one of the main concerns for residual $NH_3$ in flue gas.

SCR Process Reactor

The heat exchanger integrated into the reactor (132 of FIG. 9) can in concept be of any type—for a tube-type heat exchanger, flue gases passing within tubes with air external, or air passing within tubes with flue gas external. Any combination, number, and orientation of the heat exchange tubes can be utilized.

Alternatively, a heat exchanger concept that does not employ tubes could be used. As an illustrative example, FIG. 10 depicts a tube-type heat exchanger with hot flue gas flowing internal to the tubes 140, and combustion process air 142 flowing external to the tubes. FIG. 10 shows the tubes through which the flue gases pass to be aligned with the flow direction, but in concept the tubes can be oriented at an angle to achieve improved mixing of the flue gas and a more uniform distribution of $NH_3$. The relative size of the heat exchanger as shown in FIG. 10 is sized to reduce flue gas temperature approximately 50–175° F., lowering the reaction temperature of the catalyst layer at the exit of this heat exchanger accordingly. The actual size and the temperature reducing capability of the heat exchanger will vary with the type of fuel fired, in particular the content of $SO_3$ and NO that enters the reactor.

NO Removal and Residual NH3 Consumption

The presence of the heat exchanger, be it a tube-type design or any other type will provide flow resistance and induce turbulence, and thus improve the distribution of $NH_3$ and NO across the reactor. The result will be essentially "re-mixing" the $NH_3$ and NO at the inlet of the second catalyst layer. This will improve total process NO removal, control of residual $NH_3$, and perhaps both.

For the example case considered, it is assumed that the flue gas velocity within the cross-section of the reactor, thus reflecting the gas velocity both at the exit of the catalyst plane and entering the heat exchanger, is the usual design value of 15 aft/s. The heat exchanger will be selected to employ 2.5 in diameter tubes located on 7 inch centers. This geometry will reduce the effective flow area by 35%, elevating the gas velocity within the tube to 20 ft/sec. FIG. 10 shows the flow pattern anticipated at the inlet of the tubes, with zones of stagnation and flow recirculation 144, the latter induced by conservation of momentum of entrained flow. Similarly, the higher velocity jets of flue gas expand into the next chamber, again inducing zones of flow recirculation 146. Mixing is anticipated to occur due to (a) the zones of recirculation, at both the inlet and the outlet of the tube, and (b) the expansion of the higher velocity "jet" into the gas flow. In this manner, the heat exchanger is anticipated to simulate the actions of a perforated plate inserted into the flow stream, which is a commonly used device for improving mixing and velocity distribution.

The effect of this mixing pattern on $NH_3$/NO distribution cannot be defined without computational flow dynamic (CFD) process modeling, and the results will depend on the reactor and heat exchanger design. However, for illustrative purposes, the benefit achievable by the improved mixing due to this concept can be identified based on simple calculations and a mass balance of $NH_3$. FIG. 11 compares the key features describing $NH_3$/NO mixing and $SO_2$ conversion for the conventional SCR design and the inventive process. FIG. 11 shows the residual $NH_3$ from the inventive process is lower than from the conventional process at any given $NH_3$/NO ratio, and that the standard deviation of the $NH_3$/NO ratio entering any of the layers following the first layer is lower than the conventional design.

FIG. 11 compares the impact of the improved mixing on process operations and NOx removal. FIG. 11 shows the conventional linear relationship between NOx removal and $NH_3$/NO ratio 150, similar to that previously shown in FIG. 2. Also shown is the residual $NH_3$ production, for two cases of $NH_3$/NO mixing. The first 152, addresses the conventional design as described in FIG. 2 and FIG. 12 for the conventional SCR design, with a 5% standard deviation in $NH_3$/NO at the reactor inlet. As shown in FIG. 12, the standard deviation of $NH_3$/NO increases to 15 and 36%, respectively, at the inlet of catalyst layers 2 and 3. FIG. 11 also shows the residual $NH_3$ production for the inventive process 154, where the presence of the tube-type heat exchanger located after the first layer acts to decrease the standard deviation of $NH_3$/NO ratio entering the second and third layer (shown in FIG. 12) to 10% and 20%, respectively. Consequently, the $NH_3$/NO ratio where a residual $NH_3$ limit of 2 ppm is incurred can be increased from the baseline case of 0.90 156, to approximately 0.94 158. This change elevates NOx reduction to approximately 94%.

The benefits in terms of $NH_3$/NO mixing provided by the heat exchanger and mixing body can also be provided by conventional static mixers such as those described by Henke (U.S. Pat. No. 4,737,345), or commercial products available from companies such as Koch and Sulzer, and be installed between the catalyst layers. Thus, a static mixer could be installed between subsequent layers to improve NO removal, even if an interstage heat exchange is not utilized, and the reactor operates at one temperature.

Accordingly, as a consequence of the inventive process, an increase in $NH_3$/NO of the entire reactor is allowed by reducing the residual $NH_3$ at any operating point. It is possible to operate the process at a $NH_3/NO$ ratio approaching unity, where extremely high NOx removal will be achieved but with residual $NH_3$ generated in quantities greater than 2–3 ppm, sometimes approaching 10 ppm or more. The residual $NH_3$ will react with $SO_3$ and form ammonium sulfates and bisulfates within the air heater, which can be more easily removed by sootblowers due to the inventive shape and use of a one-piece heat exchange material. The $SO_3$ value will be controlled by the catalyst oxidation, which in most cases will be specified to be minimized for all but the lowest sulfur coals. For medium and high sulfur coals, the levels of $SO_3$ will likely exceed the stoichiometric requirement for reaction with $NH_3$, forming preferably ammonium bisulfates. For the low sulfur coals, the residual $NH_3$ will over most of the operating period exceed the $SO_3$, preferentially forming ammonium sulfates, which are more amenable to removal by sootblowing. The compressed, one piece air heater will allow the necessary cleaning so that these compounds that are intentionally generated as a consequence of high residual $NH_3$ can be removed, enabling high NOx removal.

$SO_2$ Conversion

From a process standpoint, the flue gas temperature of the catalyst following the first layer will be reduced significantly. As shown previously in FIG. 5 describing experimental data, a 100° F. reduction in catalyst operating temperature from 650° F. can lower $SO_2$ conversion of a given catalyst layer by 50%. That the last layers will operate at reduced flue gas temperature is particularly significant, due to the observation earlier that the catalyst layers following the first layer contribute disproportionately to $SO_2$ conversion, due to the lower concentration of reagent $NH_3$ in flue gas. FIG. 12 compares the calculated values of the layer by layer contribution to $SO_2$ conversion, for both the inventive process and a conventional process design. Results are shown for a 3 layer reactor. As previously reported in FIG. 4 for the conventional design case, with a 680 F gas temperature, the first, second, and third layers are believed to oxidize 0.3%, 0.5%, and 0.7% of $SO_2$ to $SO_3$, respectively. These same results are repeated in FIG. 12. For the inventive case, the first layer oxidizes 0.3% of $SO_2$, but due to lower temperature, the work of Svenka suggests the second and third layers oxidize only 0.2% of $SO_2$. For the inventive case, the contribution of the last 2 layers is significantly reduced as a contributor to the total process $SO_2$ conversion.

Selective Oxidation of Hg

The final attribute of the inventive process is the ability to transform elemental mercury to an oxidized state, without the associated deleterious impacts of higher $SO_2$ oxidation. This can be accomplished by the use of a special catalyst installed in the second, lower temperature stage of the SCR reactor. The catalyst will be designed to exhibit at the lower temperature stage a higher selectivity for Hg oxidation than for $SO_2$ oxidation.

FIG. 13 presents a conceptual display of the relative oxidation rates of mercury and $SO_2$ as a function of temperature for a NOx reducing catalyst. FIG. 13 is not known to represent any presently available commercial catalyst, but rather depicts performance characteristics of a catalyst that can be prepared given present technology. Specifically, catalyst of completely different composition other than those intended for SCR application have been developed to preferentially oxidize mercury, without oxidizing $SO_2$. Data such as in FIG. 13 is suggested to exist based on reported research results (Blythe, 2003). The results of this effort show that specialized catalyst composed of materials as widely disparate as specially activated carbon, fly ash, and palladium-based compounds can provide significant activity for Hg oxidation without oxidizing $SO_2$, although at temperatures below that for conventional SCR application, specifically at the relatively low temperatures of an electrostatic precipitator (300 F). In FIG. 13, curves describing the oxidation of both Hg 160 and $SO_2$ 162 show that significant values of each are noted at 690° F. 164. This situation is believed to describe the performance of present SCR catalysts. However, in the inventive system, subsequent layers to the first can operate at 50–175° F. lower temperature. FIG. 13 shows that for this particular catalyst, operating at 590° F. 166 significantly decreases $SO_2$ oxidation activity, while having only a minor effect of mercury oxidation. As a consequence, a catalyst with these performance characteristics can be installed in the lower temperature regions of the innovative SCR reactor, to transform elemental to oxidized mercury without the associated deleterious impact of increasing $SO_2$ oxidation.

The exact performance characteristics of the alternative mercury oxidizing catalyst will generally resemble those of FIG. 13, and allow operation at lower temperature, without compromising NOx removal or Hg oxidation. The catalyst can be of any composition, and not limited to the examples cited of activated carbon, fly ash material, and palladium-based compounds. The lower temperature will minimize the oxidation of $SO_2$ to $SO_3$. Alternatively, as suggested by Downs (undated), simply lowering the flue gas temperature of a conventional SCR catalyst can promote oxidation of Hg from the elemental to the oxidized state. Specifically, Downs reported lowering the flue gas temperature from 740° F. to 390° F. increased the oxidation of Hg from 51 to 82%. The present concept does not contemplate a 250° F. flue gas temperature drop, but this data suggests lowering flue gas temperature will improve Hg oxidation. Accordingly, a second benefit of this lowered temperature, in addition to minimizing the oxidation of $SO_2$, is to increase the oxidation of Hg.

This invention can utilize a method to maintain the flue gas temperature of the first layer above a minimum, to avoid the deposition of ammonium sulfates and bisulfates on the catalyst. Any of the previously referenced methods described by Cohen (U.S. Pat. No. 5,943,865), Zieglev (U.S. Pat. No. 5,775,216), Wiechard (U.S. Pat. No. 5,555,849), each of which are hereby incorporated by reference in their entireties, can be applied. Equivalent techniques such as using a modulating damper to a small quantity of direct combustion air leaving the compressed, one stage air heater to go directly to the boiler and bypass the interstage heater after the first catalyst layer can be utilized 134. A minimum amount of air will always be necessary in the interstage heater exchanger to avoid overheating of tubes, but some of the air can be bypassed directly to the boiler, preserving the flue gas temperature in first layer above the minimum required to avoid ABS deposition.

The conventional design basis for selecting an SCR reactor temperature is to select a temperature that provides for suitable reaction of $NH_3$ with NO, but minimizes $SO_2$ oxidation. This is the lowest temperature feasible that avoids ABS formation on the catalyst. The specific temperature of ABS formation has been shown by several investigators to be a function of relative and absolute concentration of $NH_3$, $SO_3$, and other gas constituents. Using the conventional SCR design approach, with the reactor operating at one temperature, the inlet conditions of NO and injected $NH_3$ reagent establish the minimum operating temperature of the entire reactor. At the reactor inlet, $NH_3$ levels will be 80–90% of NOx levels, typically several hundred and approaching for some units 800 ppm. The ABS formation temperature as described by investigators for these conditions may be 525–550° F. for coals with typical sulfur content, where the $SO_3$ is 5–30 ppm.

But as FIG. 4 shows, the $NH_3$ content entering each catalyst layer is different, and decreases significantly as the reaction proceeds through the reactor. Thus, each catalyst layer in concept has a unique temperature of ABS deposition. The conventional design approach dictates that all catalyst layers must be treated as though the potential ABS temperature is the same for all, when in fact it is not due to constantly decreasing flue gas $NH_3$ content.

This invention does not force all catalyst layers to operate at the same temperature constraint as the first layer. Consequently, lowering the temperature of the catalyst layers that contribute the most to reactor $SO_2$ conversion is possible without incurring ABS deposition.

Also, FIG. 4 shows how the standard deviation of the distribution of $NH_3/NO$ significantly deteriorates as the reaction progresses through subsequent catalyst layers. FIG. 4 shows that this high standard deviation of $NH_3/NO$ entering the last layer—as determined by the mixing system established at the reactor inlet—limits the entire reactor—but mixing is only controlled as far as the reactor inlet.

The use of the tube-type heat exchanger, or another heat exchanger concept, and the further mixing this device induces serves to re-establish a more uniform mixing profile, allowing lower residual $NH_3$ and higher operating $NH_3/NO$ ratio for the entire reactor.

The heat absorbing two-stage process reactor, by incorporating a conventional tube-type or other heat exchanger within the confines of an SCR process reactor NOx control, can provide at least three significant benefits.

First, the relocation of the "hot" element of the heat exchange function to the reactor, as enabled by the conventional tube-type or other heat exchanger, allows compression of the air heater to a single, one piece heat exchange surface. This combined intermediate/cold end section is more amenable to cleaning by the sootblowing media, allowing both hot-end (entrance) and cold-end (exit) sootblowers to be installed and effectively utilized. As a consequence, the one piece combined intermediate/cold end section minimizing the deposition of ABS compounds will improve the resistance to incurring a load limit due to high flue gas pressure loss. The reduction in $SO_2$ oxidation offered by the advanced reactor design will be proportionally lower as the baseline $SO_2$ conversion is reduced, as possible with advanced, low $SO_2$ oxidation catalysts.

Second, the ability to lower the SCR process reactor operating temperature by a significant extent (50–175° F.) reduces the $SO_2$ conversion of the last 1–3 catalyst layers, and allows for the use of a specially-designed catalyst that retains the ability to oxidize Hg while minimizing the oxidation of $SO_2$. Thus, the layer or layers in a conventional SCR reactor design that contribute the most to $SO_2$ conversion are controlled by lowering their operating temperature by an amount that significantly reduces $SO_2$ oxidation. For a typical reactor design of 690° F., and a coal with a sulfur content of 3% (producing 2500 ppm of $SO_2$), lowering the temperature of the last layer by 100° F. to 590° F. provides significant reduction in process temperature while-retaining an adequate margin above the calculated deposition temperature (560° F.). For a typical SCR catalyst designed to provide 1.25% $SO_2$ conversion for an entire process, the reduction by 100° F. of the last layer could reduce the $SO_2$ conversion of the last layer to as low as 0.10%. As a consequence, total reactor $SO_2$ conversion will be reduced from 0.4–0.7%, a significant reduction. For the reference 2% sulfur coal, the $SO_3$ added to the flue gas by the SCR process is reduced from 23 to 10 ppm.

Third, the improved mixing of $NH_3$ and NO in flue gas entering the last catalyst layer(s) due to the turbulence and flow distortions imposed by the heat exchanger elements. As a result, the measure of mixing that is normally invoked—the standard deviation—is reduced from typical levels of 4–6% to as low as 1–3%. The consequence of this improvement is an increase in the reagent $NH_3$ that can react with NO, and by allowing a higher $NH_3/NO$ ratio (while maintaining the residual NH3 limit), high NOx removal. In fact, the increase in $NH_3/NO$ ratio could be significant and approach unity, as the excess residual $NH_3$ would be captured as ABS within the compressed one piece air heater, and successfully cleaned.

Accordingly, this invention exploits unique and relatively unrecognized characteristics of the last catalyst layer to achieve benefits that propogate upward to the other layers of the reactor, as each catalyst layer can now enjoy a higher $NH_3/NO$ ratio.

Fourth, offering a lower temperature environment to allow for the use of a special purpose catalyst that preferentially oxidizes a significant amount of mercury, without a significant oxidation of $SO_2$ that is usually associated with such transformations that are accomplished by conventional SCR catalysts, operating at conventional temperatures, or by operating at lower temperature, promotes a higher degree of oxidation of Hg from the elemental to the oxidized state.

Citation Reference

Akron Beacon Journal, 2001 "Blue Haze Worries Town", Akron Beacon Journal, Aug. 2, 2001.

AWMA, 2001 Air & Waste Management Association, "Proceedings of the A&WMA Specialty Conference on Mercury Emissions: Fate, Effects, and Control", Aug. 20–23, 2001, Chicago, Ill.

Blythe, 2003 Blythe, G. et. al., "Pilot Testing of Oxidation Catalysts For Enhanced Mercury Control by Wet FGD", Proceedings of the Combined Power Plant Air Pollutant Control "Mega" Symposium, May, 2003, Washington, D.C.

Bondurant, 1999 Bondurant, L. P., "SCR Compatibility for the Ljungstrom Air Preheater, Proceedings of the EPRI/EPA/DOE Combined Utility Air Pollution Control Symposium: The Mega Symposium, August, 1999, Atlanta, Ga.

Bosch, 1988 Bosch, A. and Janssen, F., "The Catalytic Reduction of Nitrogen Oxides: A Review on the Fundamentals and Technology", KEMA Scientific & Technical Reports 6 (1): 1–55 (1988)

Counterman, 1999 Counteman, W. et. al., "Ljungstrom Air Preheater Fouling Due To SCR Ammonmia Slip", presentation to the 1999 EPRI SCR Workshop On Selective Catalytic Reduction, Orlando, Fla., March 1999 (see third page)

Downs, undated Downs, W., et. al., "SCR Catalyst Impact on Mercury Speciation".

EPA, 2000 EPA ICR Reports, http:www.epa.gov/ttn/uatw/combust/utiltox/utoxpg.html (October, 2000)

Gutberlet, 1992 Gutberlet, H., et. al., "Mercury In Bituminous Coal Furnaces With Flue Gas Cleaning Plants", VGB Kraftwerkstechnik 1992, 72, 586–591.

Laudel, 2003 Laudel, D. et. al., "Mercury Speciation At Power Plants Using SCR and SNCR Technology", EM, Air & Waste Management Association's Magazine for Environmental Managers"February, 2003.

Muzio, 2002 Muzio, L. J. et. al., "Overview and Status of Post-Combustion NOx Control: SNCR, SCR, and Hybrid Technologies", International Journal of Environment and Pollution, Volume 17, Nos. 1/2, 2002.

Svachula, 1993 Svachula, et. al., "Oxidation Of SO2 to $SO_3$ Over Honeycomb Denoxing Catalysts", Industrial Engineering Chemical Research, 1993, 32, 826–834.

What is claimed is:

1. A method for the selective catalytic reduction of nitrogen oxides, comprising: introducing a reducing agent into a flue gas containing nitrogen oxides; then passing the flue gas through at least a first layer of nitrogen oxide reducing catalyst where an amount of nitrogen oxides in said flue gas is reduced; then passing the flue gas through a heat exchanger that removes heat from the flue gas and also mixes the flue gas and the reducing agent; and then passing the flue gas through at least one additional layer of nitrogen oxide reducing catalyst where an additional amount of nitrogen oxides in the flue gas is reduced;

wherein said at least one heat exchanger is at least one interstage heat exchanger, that lowers flue gas temperature, and that acts as a mixing body to lower the standard deviation of the $NH_3/NO$ ratio entering catalyst layers after the-first catalyst layer, thus providing a higher amount of consumption of both ammonia and NOx in a reactor than would be achieved in the absence of the at least one interstage heat exchanger; and wherein the at least one interstage heat exchanger transfers 50–175° F. of heat; and comprises utilizing a one-piece heat exchange element in a Ljungstrom-type heat exchanger, and wherein ammonium sulfates and ammonium bisulfates are cleaned from air heater surfaces with sootblowers located at both the inlet and outlet of the air heater.

2. The method of claim 1 wherein the reducing medium is ammonia and the NH3/NO ratio is between 0.90 and 0.98.

3. The method of claim 2 wherein the $NH_3$/NO ratio is about 1:1.

4. The method of claim 1, further comprising before passing the flue gas through the at least one additional catalyst layer, passing the flue gas through a separate static mixing device to mix reducing agent and NO, further mixing the partially reacted NH.sub.3 and NO.

5. The method of claim 1, further comprising passing the flue gas through at least one additional layer of a special-purpose catalyst for oxidation of mercury, said special-purpose catalyst not representing a proportional change in concentration of the ingredients of a conventional SCR catalyst, said special-purpose catalyst having a formulation preferential for Hg oxidation.

6. The method of claim 1, further comprising, passing a portion of the flue gas through a combustion air bypass duct controlled by a modulating damper to direct combustion air leaving a compressed, one stage air heater directly to a boiler thus bypassing the interstage heater after the first catalyst layer, while retaining a minimum amount of air in the interstage heater exchanger avoiding overheating of tubes, preserving gas temperature in the first catalyst layer above a minimum required to avoid ABS deposition.

7. A method for the selective catalytic reduction of nitrogen oxides, comprising: introducing a reducing agent into a flue gas containing nitrogen oxides; then passing the flue gas through at least a first layer of nitrogen oxide reducing catalyst where an amount of nitrogen oxides in said flue gas is reduced; then passing the flue gas through a heat exchanger that removes heat from the flue gas and also mixes the flue gas and the reducing agent; and then passing the flue gas through at least one additional layer of nitrogen oxide reducing catalyst where an additional amount of nitrogen oxides in the flue gas is reduced;

wherein said at least one heat exchanger is at least one interstage heat exchanger, that lowers flue gas temperature, and that acts as a mixing body to lower the standard deviation of the $NH_3$/NO ratio entering catalyst layers after the first catalyst layer, thus providing a higher amount of consumption of both ammonia and NOx in a reactor than would be achieved in the absence of the at least one interstage heat exchanger; and wherein the at least one interstage heat exchanger transfers 50–175° F. of heat; and comprises utilizing a one-piece heat exchange element in a Ljungstrom-type heat exchanger, and wherein ammonium sulfates and ammonium bisulfates are cleaned from air heater surfaces.

* * * * *